United States Patent
Tacer et al.

(10) Patent No.: US 11,985,179 B1
(45) Date of Patent: May 14, 2024

(54) SPEECH SIGNAL BANDWIDTH EXTENSION USING CASCADED NEURAL NETWORKS

(71) Applicant: Amazon Technologies, Inc., Seattle, WA (US)

(72) Inventors: Berkant Tacer, Bellevue, WA (US); Nikhil Shankar, Richardson, TX (US)

(73) Assignee: Amazon Technologies, Inc., Seattle, WA (US)

( * ) Notice: Subject to any disclaimer, the term of this patent is extended or adjusted under 35 U.S.C. 154(b) by 309 days.

(21) Appl. No.: 17/101,108

(22) Filed: Nov. 23, 2020

(51) Int. Cl.
*H04L 65/75* (2022.01)
*G06N 3/045* (2023.01)
*G06N 3/048* (2023.01)
*G06N 3/067* (2006.01)
*G06N 3/08* (2023.01)
*G10L 19/00* (2013.01)
(Continued)

(52) U.S. Cl.
CPC ............ *H04L 65/75* (2022.05); *G06N 3/045* (2023.01); *G06N 3/048* (2023.01); *G06N 3/08* (2013.01); *G10L 19/00* (2013.01); *G10L 21/00* (2013.01); *H04L 65/403* (2013.01); *H04S 3/008* (2013.01); *G06N 3/0675* (2013.01); *H04S 2400/03* (2013.01); *H04S 2400/05* (2013.01); *H04S 2420/07* (2013.01)

(58) Field of Classification Search
CPC ..... H04L 65/75; H04L 65/403; G06N 3/0454; G06N 3/0481; G06N 3/08; G06N 3/0675; G10L 19/00; G10L 21/00; H04S 3/008; H04S 2400/03; H04S 2400/05; H04S 2420/07
See application file for complete search history.

(56) References Cited

U.S. PATENT DOCUMENTS

2011/0099004 A1* 4/2011 Krishnan .............. G10L 21/038
704/E21.001
2015/0162008 A1* 6/2015 Villette ................. G10L 21/038
704/500
(Continued)

OTHER PUBLICATIONS

Ren et al. "DN-ResNet: Efficient Deep Residual Network for Image Denoising" Asian Conference on Computer Vision. Springer, Cham, 2018. (Year: 2018).*

(Continued)

*Primary Examiner* — Douglas Godbold
*Assistant Examiner* — Edward Tracy, Jr.
(74) *Attorney, Agent, or Firm* — Pierce Atwood LLP

(57) ABSTRACT

A system configured to improve a voice quality during a communication session by performing bandwidth extension on a narrowband speech signal to generate a wideband speech signal with higher audio quality. For example, a system can extend a speech bandwidth from a narrowband signal having a first bandwidth (e.g., 4 kHz) to a wideband signal having a second bandwidth (e.g., 8 kHz or higher). To perform bandwidth extension, the system may include cascaded neural networks, such as two or more sub-pixel convolutional neural networks (CNNs) connected in series. In some examples, a first sub-pixel CNN may extend the speech bandwidth from 4 kHz to 6 kHz and a second sub-pixel CNN may extend the speech bandwidth from 6 kHz to 8 kHz. Alternatively, the system may use three or more cascaded neural networks and/or may extend the speech bandwidth above 8 kHz without departing from the disclosure.

20 Claims, 19 Drawing Sheets

(51) Int. Cl.
  *G10L 21/00* (2013.01)
  *H04L 65/403* (2022.01)
  *H04S 3/00* (2006.01)

(56) References Cited

U.S. PATENT DOCUMENTS

| | | | |
|---|---|---|---|
| 2019/0130257 A1* | 5/2019 | Meyerson | G06N 3/045 |
| 2020/0243102 A1* | 7/2020 | Schmidt | G10L 19/005 |
| 2021/0166705 A1* | 6/2021 | Chang | G10L 21/038 |
| 2021/0183374 A1* | 6/2021 | Thomson | G10L 15/30 |
| 2022/0156524 A1* | 5/2022 | Alon | G06F 18/214 |

OTHER PUBLICATIONS

Kim, Sung, and Visvesh Sathe. "Bandwidth extension on raw audio via generative adversarial networks." arXiv preprint arXiv: 1903.09027 (2019). (Year: 2019).*

* cited by examiner

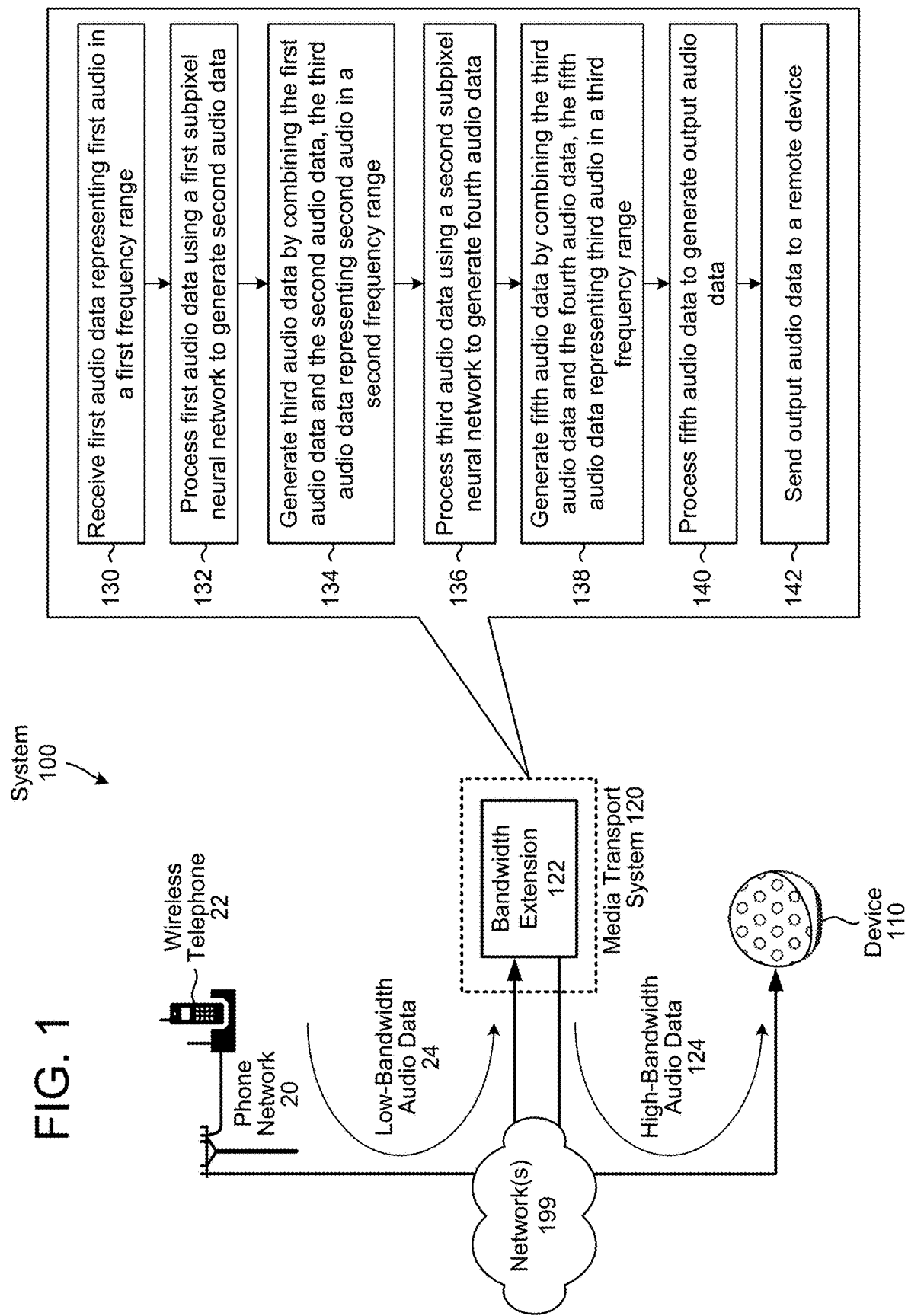

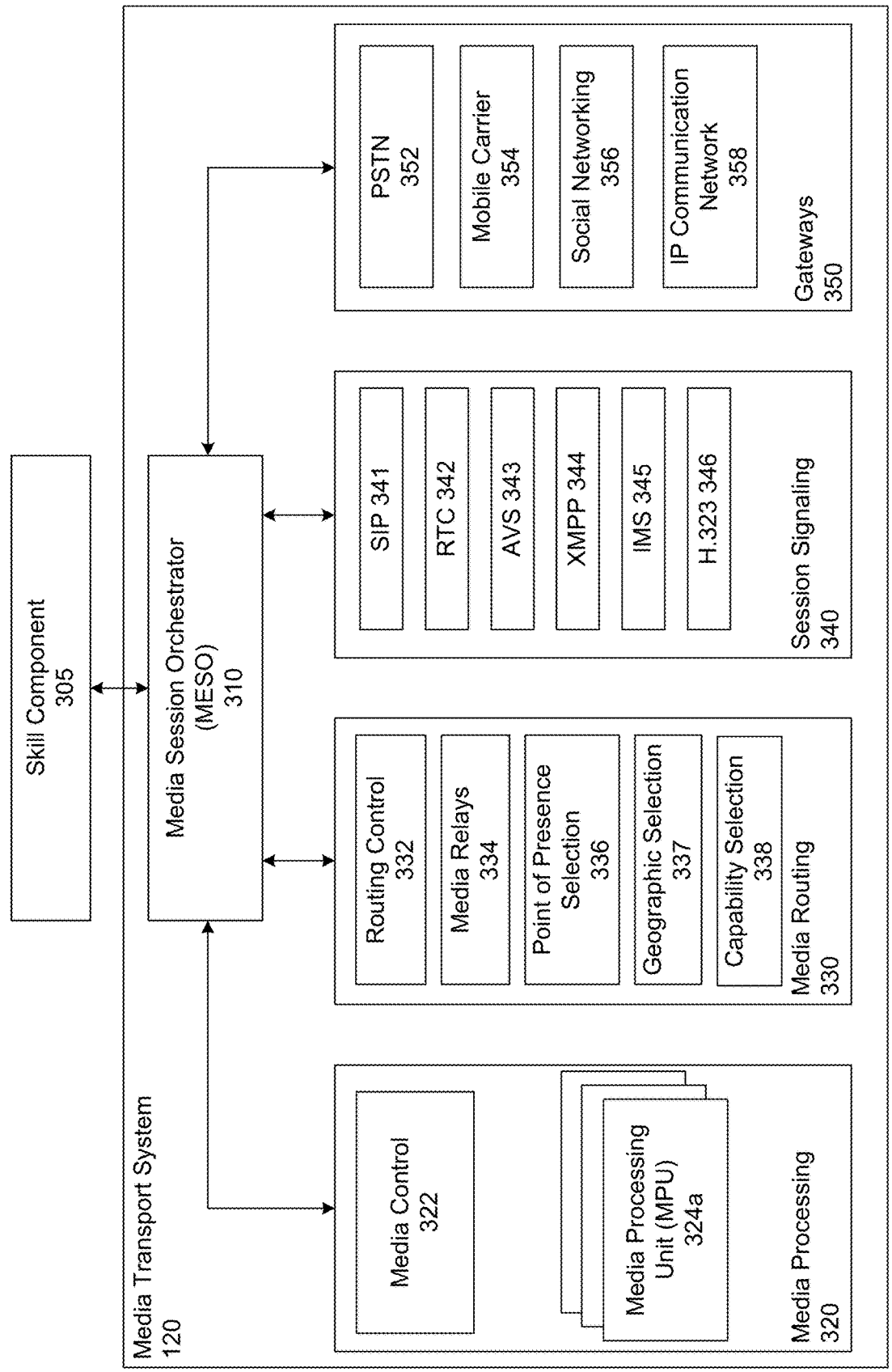

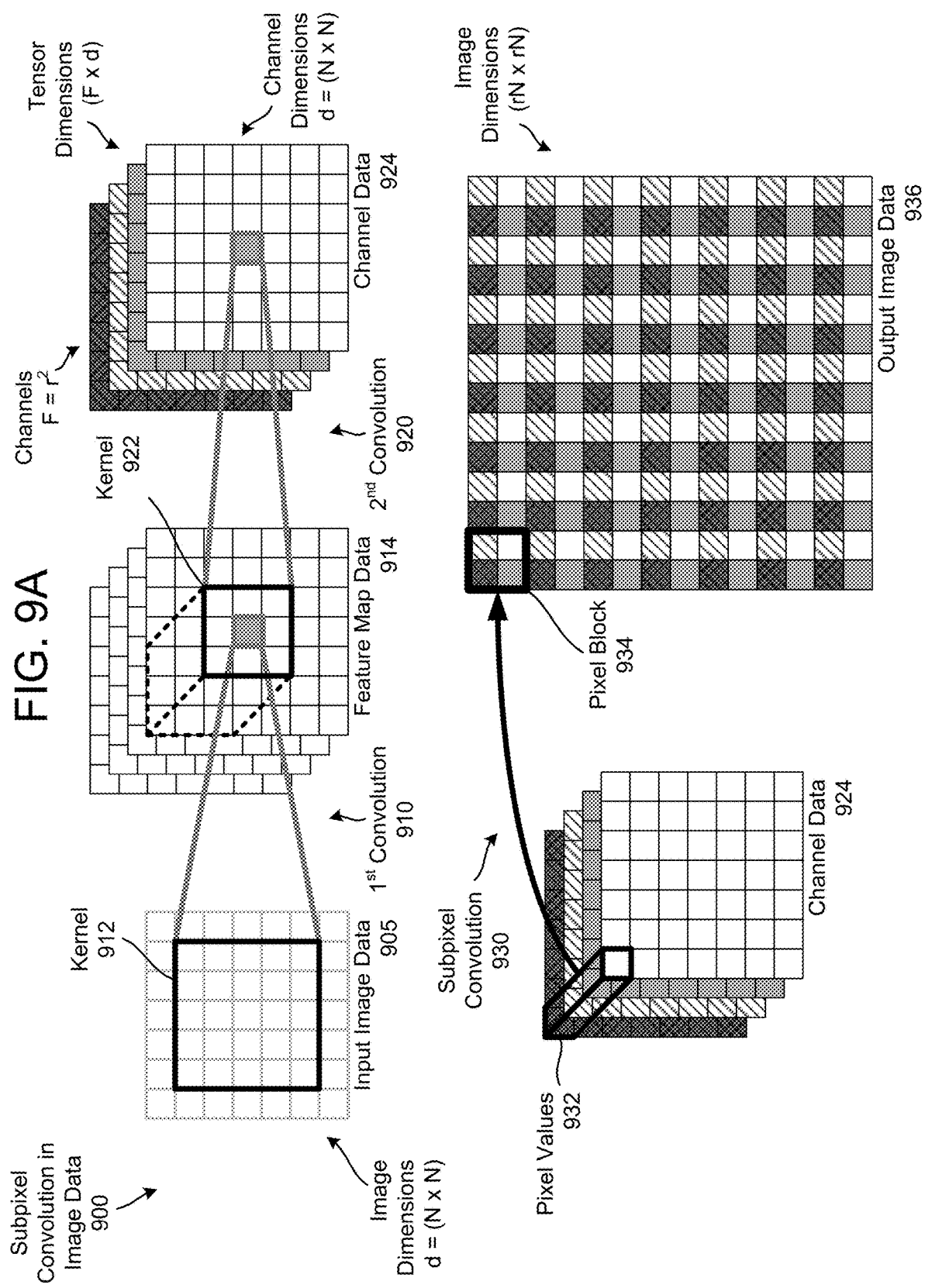

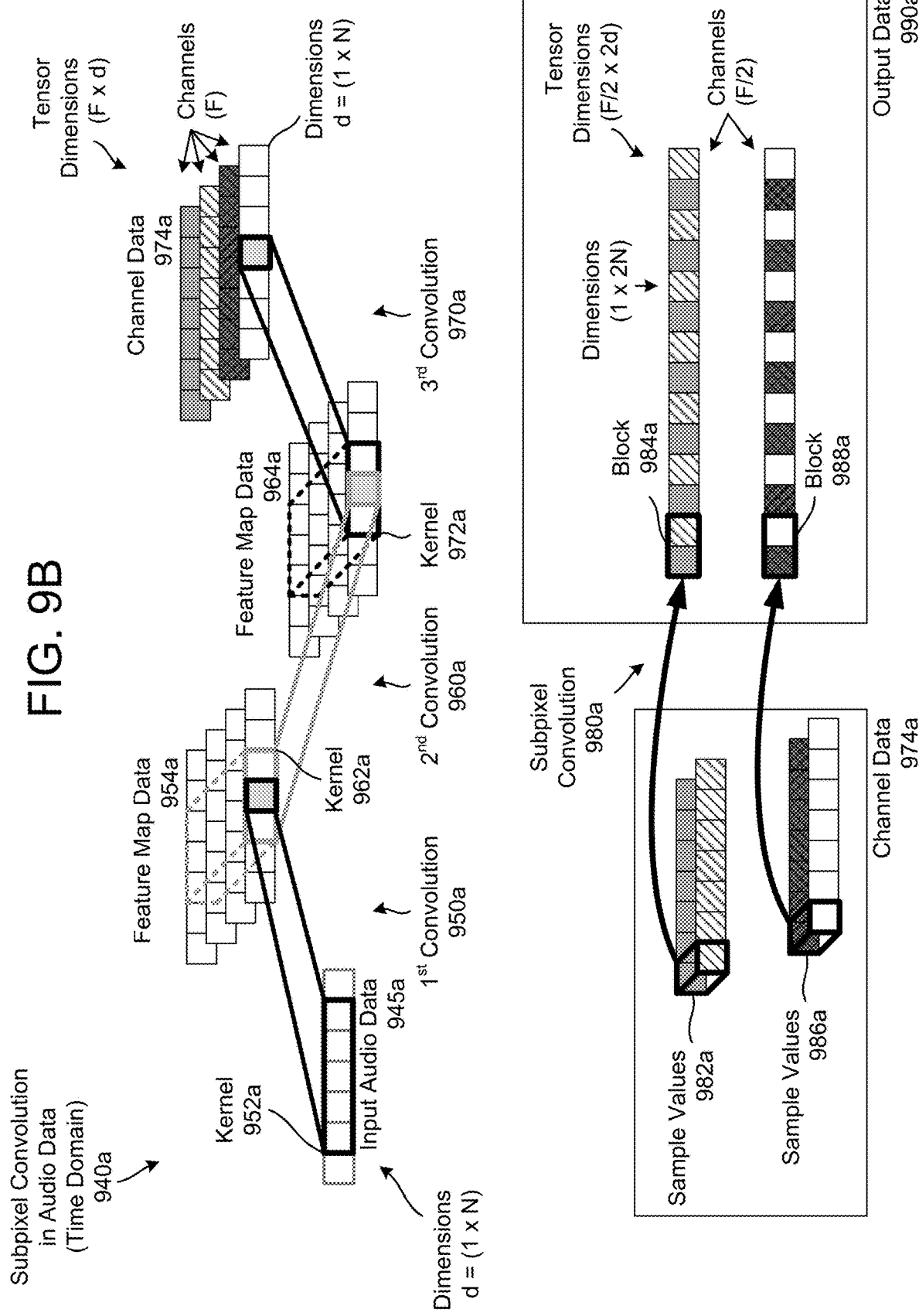

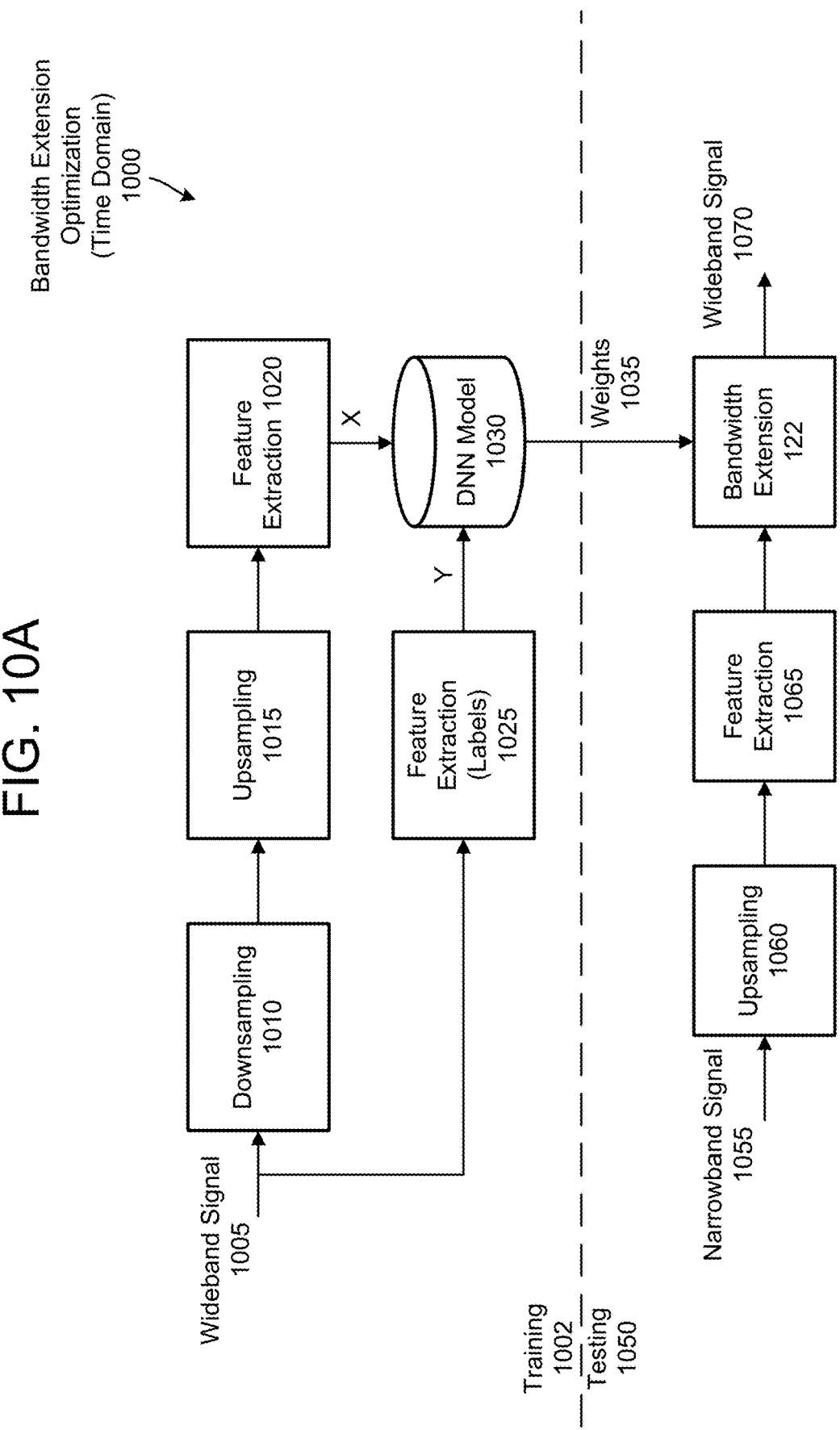

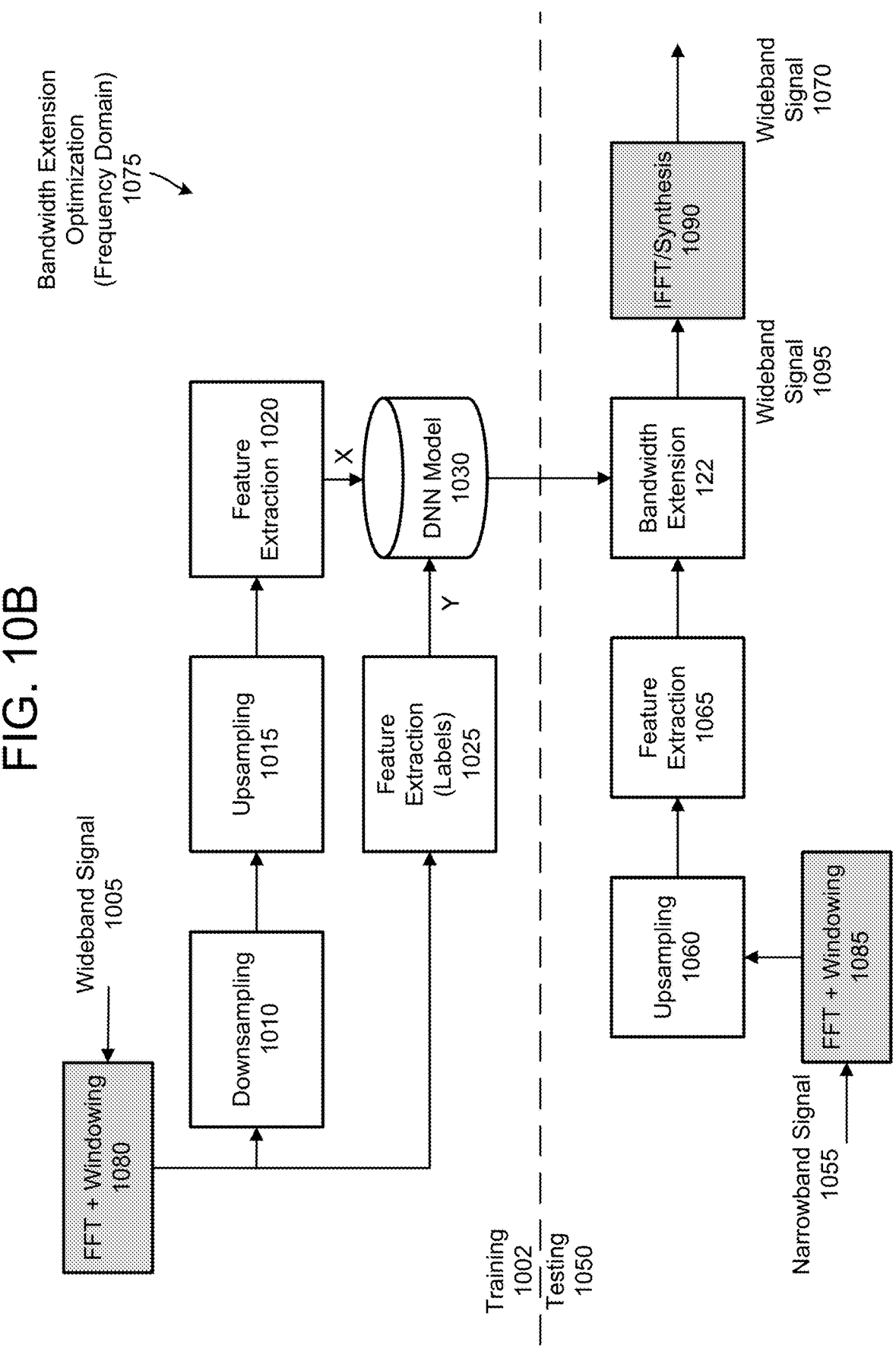

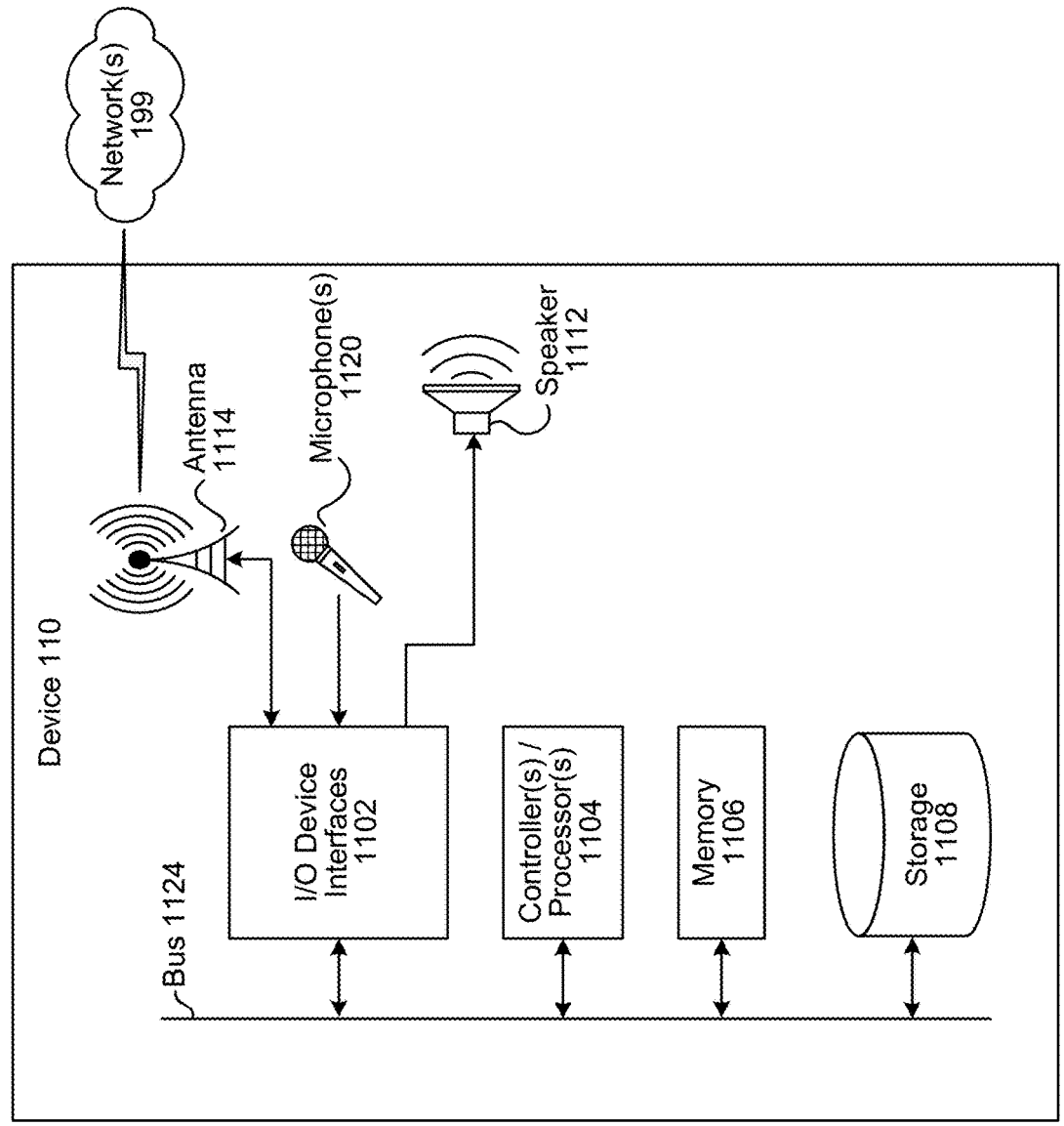

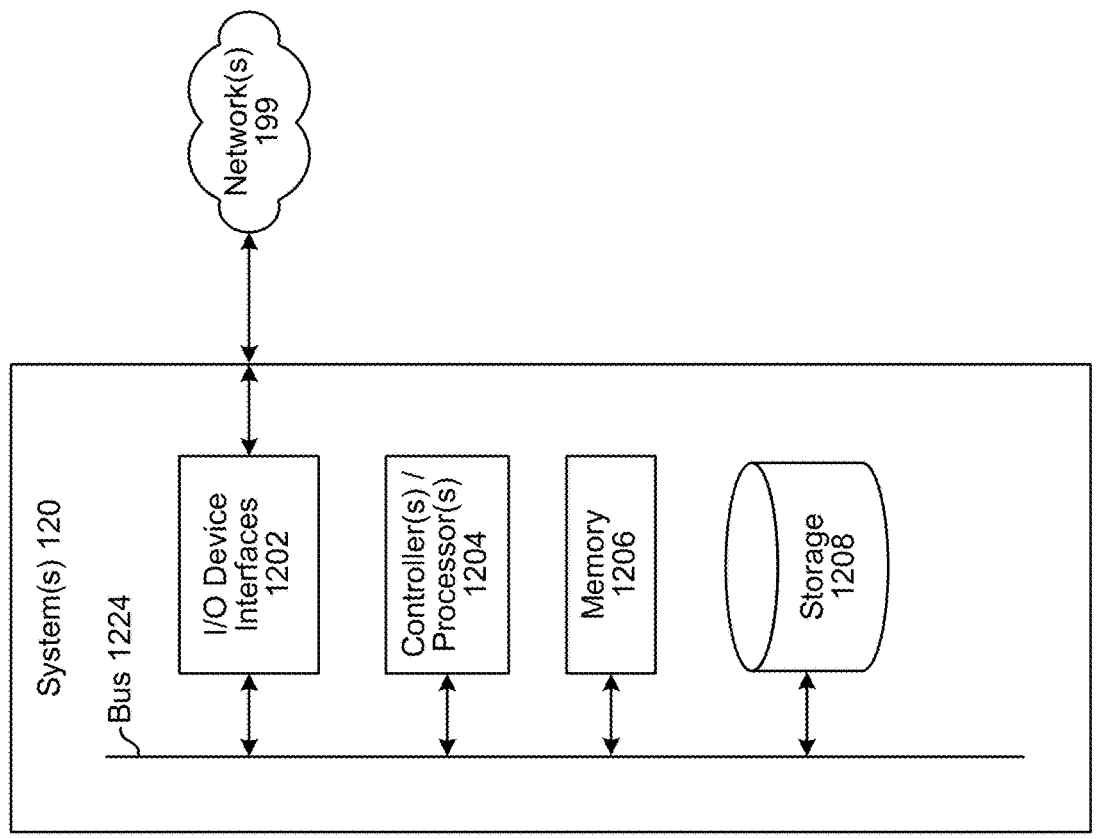

SPEECH SIGNAL BANDWIDTH EXTENSION USING CASCADED NEURAL NETWORKS

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 1 illustrates a system according to embodiments of the present disclosure.

FIGS. 3A-3B illustrate example component diagrams of a media transport system configured to perform media processing according to embodiments of the present disclosure.

FIGS. 9A-9C illustrate examples of performing subpixel convolution using image data and audio data according to embodiments of the present disclosure.

FIGS. 10A-10B illustrate example component diagrams for performing bandwidth extension optimization according to embodiments of the present disclosure.

FIG. 11 is a block diagram conceptually illustrating example components of a device, according to embodiments of the present disclosure.

FIG. 12 is a block diagram conceptually illustrating example components of a system, according to embodiments of the present disclosure.

DETAILED DESCRIPTION

Figure 2A:
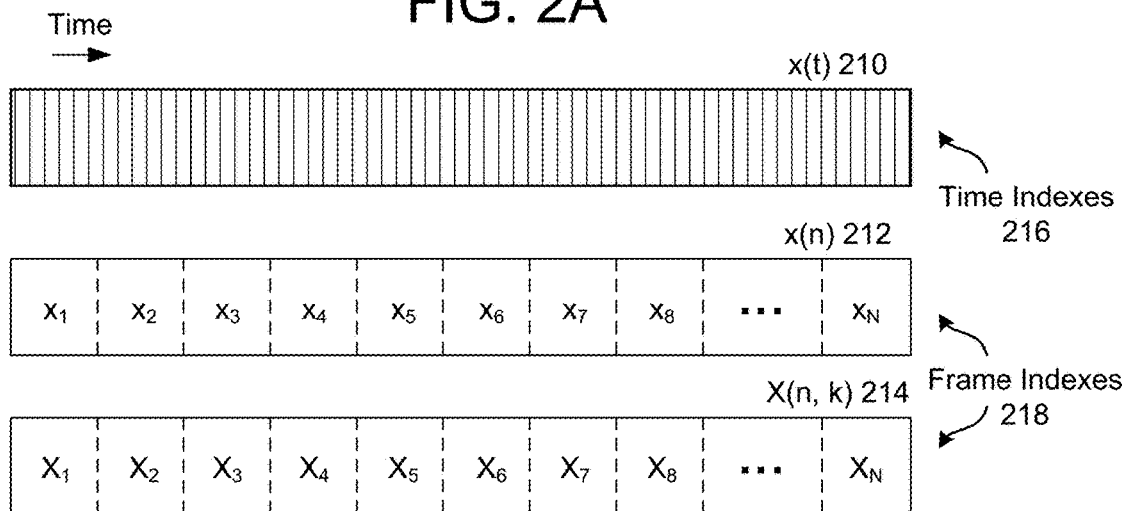
FIGS. 2A-2D illustrate examples of frame indexes, tone indexes, and channel indexes.

Electronic devices may be used to capture and/or process audio data as well as output audio represented in the audio data. During a communication session between a first device and a second device, such as a Voice over Internet Protocol (VoIP) communication session, the first device may capture first audio data and send the first audio data to the second device for playback, and the second device may use the first audio data to generate first audio. Due to bandwidth limitations present in the communication session, the first audio data may be limited to a first speech bandwidth (e.g., 4 kHz), which may be referred to as a narrowband signal. For example, some telephone networks have limited bandwidth and generate narrowband signals having a frequency range of 200 Hz to 3.2 kHz (e.g., speech bandwidth less than 4 kHz), which may result in poor voice quality for the second device.

To improve a voice quality during a communication session, devices, systems and methods are disclosed that perform bandwidth extension on a narrowband speech signal to generate a wideband speech signal with higher audio quality. For example, a system can extend a speech bandwidth from 4 kHz to 8 kHz or higher. To perform bandwidth extension, the system may include cascaded neural networks, such as two or more sub-pixel convolutional neural networks (CNNs) connected in series. In some examples, a first sub-pixel CNN may extend the speech bandwidth from 4 kHz to 6 kHz and a second sub-pixel CNN may extend the speech bandwidth from 6 kHz to 8 kHz. However, the disclosure is not limited thereto and the system may include three or more cascaded neural networks and/or may extend the speech bandwidth above 8 kHz without departing from the disclosure.

FIG. 1 illustrates a high-level conceptual block diagram of a system 100 configured to perform bandwidth extension according to embodiments of the disclosure. Although FIG. 1 and other figures/discussion illustrate the operation of the system in a particular order, the steps described may be performed in a different order (as well as certain steps removed or added) without departing from the intent of the disclosure. As illustrated in FIG. 1, the system 100 may include a media transport system 120 that may be communicatively coupled to network(s) 199. For example, the media transport system 120 may be configured to receive low-bandwidth audio data 24 (e.g., narrowband audio signal) from a phone network 20 and perform bandwidth extension to generate high-bandwidth audio data 124 (e.g., wideband audio signal).

As illustrated in FIG. 1, a telephone (e.g., wireless telephone 22, although the disclosure is not limited thereto) may generate the low-bandwidth audio data 24 and may send the low-bandwidth audio data 24 to the media transport system 120 via the phone network 20. For example, the phone network 20 may limit the low-bandwidth audio data 24 to a first frequency range (e.g., 4 kHz speech bandwidth). Thus, the low-bandwidth audio data 24 may only represent speech content within the first frequency range (e.g., 0-4 kHz), meaning that the low-bandwidth audio data 24 represents first audio comprising first frequency components within the first frequency range. In some examples, the phone network 20 may limit the low-bandwidth audio data to a frequency range from 200 Hz to 3.2 kHz (e.g., 3 kHz speech bandwidth), although the disclosure is not limited thereto.

While FIG. 1 illustrates an example of a wireless telephone 22 generating the low-bandwidth audio data 24 and sending the low-bandwidth audio data 24 to the media transport system 120 via the phone network 20, the disclosure is not limited thereto. For example, the low-bandwidth audio data 24 may be generated by the wireless telephone 22, a wired telephone, a cellular phone, a computer, a device 110, and/or any other electronic device without departing from the disclosure. In some examples, the phone network may correspond to a public switched telephone network (PSTN), a cable television (TV) network, a public land mobile network (PLMN) (e.g., cellular network), a Voice over Internet Protocol (VoIP) provider, and/or the like without departing from the disclosure.

During a communication session between the wireless telephone 22 and a device 110, the system 100 may perform bandwidth extension to improve an audio quality of the communication session. As illustrated in FIG. 1, the system 100 may perform bandwidth extension on the low-bandwidth audio data 24 to generate the high-bandwidth audio data 124, which has a second frequency range (e.g., 8 kHz speech bandwidth). For example, the high-bandwidth audio data 124 may represent speech content within the second frequency range (e.g., 0-8 kHz), meaning that the high-bandwidth audio data 124 represents second audio comprising second frequency components within the second frequency range. Thus, the high-bandwidth audio data 124 uses a wider frequency spectrum to achieve better voice quality than the low-bandwidth audio data 24. In some examples, the second frequency range may extend from 200 Hz to 8.2 kHz (e.g., 8 kHz speech bandwidth), although the disclosure is not limited thereto.

As illustrated in FIG. 1, the system 100 may be configured to perform bandwidth extension to a narrowband speech signal to generate a wideband speech signal with higher audio quality. After performing bandwidth extension to generate the high-bandwidth audio data 124, the media transport system 120 may send the high-bandwidth audio data 124 to the device 110. Thus, the system 100 may improve the voice quality of the audio signal being sent to the device 110 during the communication session. As used herein, the communication session may correspond to a Voice over Internet Protocol (VoIP) communication session, although the disclosure is not limited thereto.

As described in greater detail below, the system 100 may perform bandwidth extension using a bandwidth extension component 122. The bandwidth extension component 122 may recreate high-quality audio data from low-quality, down-sampled input audio data that includes only a small fraction of the original samples. For example, the bandwidth extension component 122 may use machine learning techniques, such as neural network-based techniques inspired by image super-resolution algorithms, to interpolate the low-resolution narrowband signal to a higher-resolution wideband signal (e.g., predict the missing samples of the narrowband signal). Conventional methods operate on a larger frame length and also need information from previous audio frames to train the DNN model. However, this results in latency and/or distortion and is not capable of real-time processing during a communication session (e.g., Voice over Internet Protocol (VoIP) communication session).

In some examples, the bandwidth extension component 122 may include cascaded neural networks, as described in greater detail below with regard to FIGS. 5-8B, that extend a speech bandwidth from 4 kHz to 8 kHz or higher. As illustrated in FIGS. 5-8B, the cascaded neural networks may include two or more subpixel convolutional neural networks (CNNs) connected in series. For example, the first subpixel CNN may extend the speech bandwidth from 4 kHz to 6 kHz and the second subpixel CNN may extend the speech bandwidth from 6 kHz to 8 kHz, although the disclosure is not limited thereto.

In some examples, the system 100 may perform bandwidth extension within the media transport system 120. For example, FIG. 1 illustrates an example in which the media transport system 120 includes the bandwidth extension component 122. However, the disclosure is not limited thereto, and the bandwidth extension component 122 may be included in one or more devices without departing from the disclosure. For example, the bandwidth extension component 122 may be included in the device 110 without departing from the disclosure.

As illustrated in FIG. 1, the bandwidth extension component 122 may receive (130) first audio data representing first audio in a first frequency range, may process (132) the first audio data using a first subpixel neural network to generate second audio data, and may generate (134) third audio data by combining the first audio data and the second audio data. The third audio data may represent second audio in a second frequency range that is larger than the first frequency range. For example, the first audio data may represent the first audio within the first frequency range having a first bandwidth (e.g., 4 kHz), whereas the third audio data may represent the second audio within the second frequency range having a second bandwidth (e.g., 6 kHz), although the disclosure is not limited thereto.

The bandwidth extension component 122 may process (136) the third audio data using a second subpixel neural network to generate fourth audio data and may generate (138) fifth audio data by combining the third audio data and the fourth audio data. The fifth audio data may represent third audio in a third frequency range that is larger than the second frequency range. For example, the third audio data may represent the second audio within the second frequency range having the second bandwidth (e.g., 6 kHz), whereas the fifth audio data may represent the third audio within the third frequency range having a third bandwidth (e.g., 8 kHz), although the disclosure is not limited thereto.

The system 100 may process (140) the fifth audio data to generate output audio data and may send (142) the output audio data to a remote device. In the example illustrated in FIG. 1, the system 100 may process the fifth audio data to generate the high-bandwidth audio data 124 and may send the high-bandwidth audio data 124 to the device 110.

The disclosure is not limited thereto, however, and in other examples the bandwidth extension component 122 may be included in the device 110 without departing from the disclosure. For example, the device 110 may receive the low-bandwidth audio data 24 and generate the high-bandwidth audio data 124. In some examples, the device 110 may send the high-bandwidth audio data 124 to a remote device (e.g., another device 110, a remote system, etc.). Additionally or alternatively, the device 110 may generate the high-bandwidth audio data 124 and may generate output audio using the high-bandwidth audio data 124. Thus, the device 110 may improve an audio quality of the output audio by performing bandwidth extension using the bandwidth extension component 122 without departing from the disclosure.

An audio signal is a representation of sound and an electronic representation of an audio signal may be referred to as audio data, which may be analog and/or digital without departing from the disclosure. For ease of illustration, the disclosure may refer to either audio data (e.g., microphone audio data, input audio data, etc.) or audio signals (e.g., microphone signal, input audio signal, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

In some examples, the audio data may correspond to audio signals in the time-domain. However, the disclosure is not limited thereto and the device 110 may convert these signals to the frequency-domain or subband-domain prior to performing additional processing, such as acoustic echo cancellation (AEC), tap detection, and/or the like. For example, the device 110 may convert the time-domain signal to the frequency-domain using a Fast Fourier Transform (FFT) and/or the like. Additionally or alternatively, the device 110 may convert the time-domain signal to the subband-domain by applying a bandpass filter or other filtering to select a portion of the time-domain signal within a desired frequency range.

As used herein, audio signals or audio data (e.g., microphone audio data, or the like) may correspond to a specific range of frequency bands. For example, the audio data may correspond to a human hearing range (e.g., 20 Hz-20 kHz), although the disclosure is not limited thereto.

As used herein, a frequency band (e.g., frequency bin) corresponds to a frequency range having a starting frequency and an ending frequency. Thus, the total frequency range may be divided into a fixed number (e.g., 256, 512, etc.) of frequency ranges, with each frequency range referred to as a frequency band and corresponding to a uniform size. However, the disclosure is not limited thereto and the size of the frequency band may vary without departing from the disclosure.

FIGS. 2A-2D illustrate examples of frame indexes, tone indexes, and channel indexes. As described above, the device 110 may generate microphone audio data xm(t) using microphone(s) 112. For example, a first microphone 112a may generate first microphone audio data xm1(t) in a time domain, a second microphone 112b may generate second microphone audio data xm2(t) in the time domain, and so on. As illustrated in FIG. 2A, a time domain signal may be represented as microphone audio data x(t) 210, which is comprised of a sequence of individual samples of audio data. Thus, x(t) denotes an individual sample that is associated with a time t.

While the microphone audio data x(t) 210 is comprised of a plurality of samples, in some examples the device 110 may group a plurality of samples and process them together. As illustrated in FIG. 2A, the device 110 may group a number of samples together in a frame to generate microphone audio data x(n) 212. As used herein, a variable x(n) corresponds to the time-domain signal and identifies an individual frame (e.g., fixed number of samples s) associated with a frame index n.

Additionally or alternatively, the device 110 may convert microphone audio data x(n) 212 from the time domain to the frequency domain or subband domain. For example, the device 110 may perform Discrete Fourier Transforms (DFTs) (e.g., Fast Fourier transforms (FFTs), short-time Fourier Transforms (STFTs), and/or the like) to generate microphone audio data X(n, k) 214 in the frequency domain or the subband domain. As used herein, a variable X(n, k) corresponds to the frequency-domain signal and identifies an individual frame associated with frame index n and tone index k. As illustrated in FIG. 2A, the microphone audio data x(t) 212 corresponds to time indexes 216, whereas the microphone audio data x(n) 212 and the microphone audio data X(n, k) 214 corresponds to frame indexes 218.

A Fast Fourier Transform (FFT) is a Fourier-related transform used to determine the sinusoidal frequency and phase content of a signal, and performing FFT produces a one-dimensional vector of complex numbers. This vector can be used to calculate a two-dimensional matrix of frequency magnitude versus frequency. In some examples, the system 100 may perform FFT on individual frames of audio data and generate a one-dimensional and/or a two-dimensional matrix corresponding to the microphone audio data X(n). However, the disclosure is not limited thereto and the system 100 may instead perform short-time Fourier transform (STFT) operations without departing from the disclosure. A short-time Fourier transform is a Fourier-related transform used to determine the sinusoidal frequency and phase content of local sections of a signal as it changes over time.

Using a Fourier transform, a sound wave such as music or human speech can be broken down into its component "tones" of different frequencies, each tone represented by a sine wave of a different amplitude and phase. Whereas a time-domain sound wave (e.g., a sinusoid) would ordinarily be represented by the amplitude of the wave over time, a frequency domain representation of that same waveform comprises a plurality of discrete amplitude values, where each amplitude value is for a different tone or "bin." 50, for example, if the sound wave consisted solely of a pure sinusoidal 1 kHz tone, then the frequency domain representation would consist of a discrete amplitude spike in the bin containing 1 kHz, with the other bins at zero. In other words, each tone "k" is a frequency index (e.g., frequency bin).

FIG. 2A illustrates an example of time indexes 216 (e.g., microphone audio data x(t) 210) and frame indexes 218 (e.g., microphone audio data x(n) 212 in the time domain and microphone audio data X(n, k) 216 in the frequency domain). For example, the system 100 may apply FFT processing to the time-domain microphone audio data x(n) 212, producing the frequency-domain microphone audio data X(n,k) 214, where the tone index "k" (e.g., frequency index) ranges from 0 to K and "n" is a frame index ranging from 0 to N. As illustrated in FIG. 2A, the history of the values across iterations is provided by the frame index "n", which ranges from 1 to N and represents a series of samples over time.

Figure 2B:
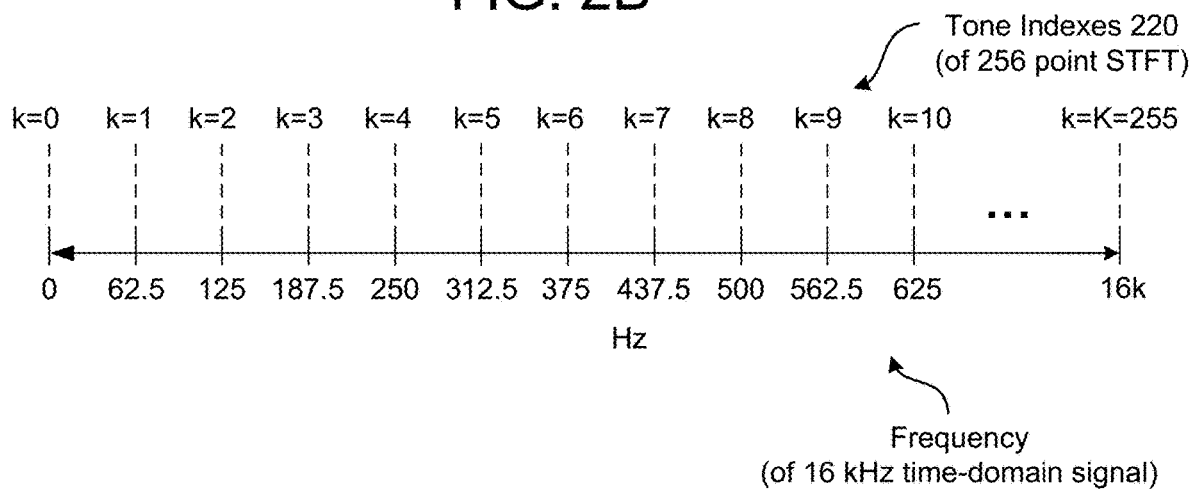

FIG. 2B illustrates an example of performing a K-point FFT on a time-domain signal. As illustrated in FIG. 2B, if a 256-point FFT is performed on a 16 kHz time-domain signal, the output is 256 complex numbers, where each complex number corresponds to a value at a frequency in increments of 16 kHz/256, such that there is 125 Hz between points, with point 0 corresponding to 0 Hz and point 255 corresponding to 16 kHz. As illustrated in FIG. 2B, each tone index 220 in the 256-point FFT corresponds to a frequency range (e.g., subband) in the 16 kHz time-domain signal. While FIG. 72B illustrates the frequency range being divided into 256 different subbands (e.g., tone indexes), the disclosure is not limited thereto and the system 100 may divide the frequency range into K different subbands (e.g., K indicates an FFT size). While FIG. 2B illustrates the tone index 220 being generated using a Fast Fourier Transform (FFT), the disclosure is not limited thereto. Instead, the tone index 220 may be generated using Short-Time Fourier Transform (STFT), generalized Discrete Fourier Transform (DFT) and/or other transforms known to one of skill in the art (e.g., discrete cosine transform, non-uniform filter bank, etc.).

Figure 2C:
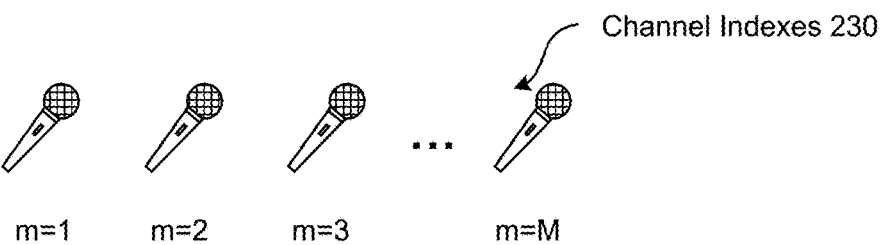

The system 100 may include multiple microphone(s) 112, with a first channel m corresponding to a first microphone 112a, a second channel (m+1) corresponding to a second microphone 112b, and so on until a final channel (MP) that corresponds to microphone 112M. FIG. 2C illustrates channel indexes 230 including a plurality of channels from channel m1 to channel M. While many drawings illustrate two channels (e.g., two microphones 112), the disclosure is not limited thereto and the number of channels may vary. For the purposes of discussion, an example of system 100 includes "M" microphones 112 (M>1) for hands free near-end/far-end distant speech recognition applications.

While FIGS. 2A-2D are described with reference to the microphone audio data xm(t), the disclosure is not limited thereto and the same techniques apply to the playback audio data xr(t) without departing from the disclosure. Thus, playback audio data xr(t) indicates a specific time index t from a series of samples in the time-domain, playback audio data xr(n) indicates a specific frame index n from series of frames in the time-domain, and playback audio data Xr(n, k) indicates a specific frame index n and frequency index k from a series of frames in the frequency-domain.

Prior to converting the microphone audio data xm(n) and the playback audio data xr(n) to the frequency-domain, the device 110 must first perform time-alignment to align the playback audio data xr(n) with the microphone audio data xm(n). For example, due to nonlinearities and variable delays associated with sending the playback audio data xr(n) to the loudspeaker(s) 114 using a wireless connection, the playback audio data xr(n) is not synchronized with the microphone audio data xm(n). This lack of synchronization may be due to a propagation delay (e.g., fixed time delay) between the playback audio data xr(n) and the microphone audio data xm(n), clock jitter and/or clock skew (e.g., difference in sampling frequencies between the device 110 and the loudspeaker(s) 114), dropped packets (e.g., missing samples), and/or other variable delays.

To perform the time alignment, the device 110 may adjust the playback audio data xr(n) to match the microphone audio data xm(n). For example, the device 110 may adjust an offset between the playback audio data xr(n) and the microphone audio data xm(n) (e.g., adjust for propagation delay), may add/subtract samples and/or frames from the playback audio data xr(n) (e.g., adjust for drift), and/or the like. In some examples, the device 110 may modify both the microphone audio data and the playback audio data in order to synchronize the microphone audio data and the playback audio data. However, performing nonlinear modifications to the microphone audio data results in first microphone audio data associated with a first microphone to no longer be synchronized with second microphone audio data associated with a second microphone. Thus, the device 110 may instead modify only the playback audio data so that the playback audio data is synchronized with the first microphone audio data.

While FIG. 2A illustrates the frame indexes 218 as a series of distinct audio frames, the disclosure is not limited thereto. In some examples, the device 110 may process overlapping audio frames and/or perform calculations using overlapping time windows without departing from the disclosure. For example, a first audio frame may overlap a second audio frame by a certain amount (e.g., 80%), such that variations between subsequent audio frames are reduced. Additionally or alternatively, the first audio frame and the second audio frame may be distinct without overlapping, but the device 110 may determine power value calculations using overlapping audio frames. For example, a first power value calculation associated with the first audio frame may be calculated using a first portion of audio data (e.g., first audio frame and n previous audio frames) corresponding to a fixed time window, while a second power calculation associated with the second audio frame may be calculated using a second portion of the audio data (e.g., second audio frame, first audio frame, and n−1 previous audio frames) corresponding to the fixed time window. Thus, subsequent power calculations include n overlapping audio frames.

Figure 2D:
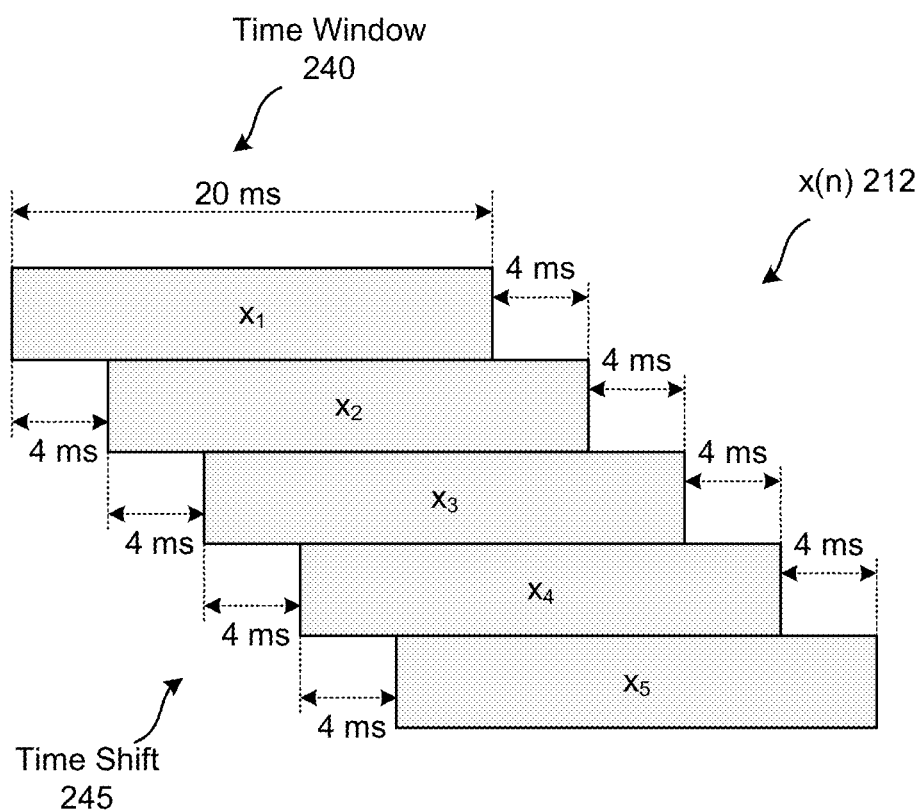

As illustrated in FIG. 2D, overlapping audio frames may be represented as overlapping audio data associated with a time window 240 (e.g., 20 ms) and a time shift 245 (e.g., 4 ms) between neighboring audio frames. For example, a first audio frame x1 may extend from 0 ms to 20 ms, a second audio frame x2 may extend from 4 ms to 24 ms, a third audio frame x3 may extend from 8 ms to 28 ms, and so on. Thus, the audio frames overlap by 80%, although the disclosure is not limited thereto and the time window 240 and the time shift 245 may vary without departing from the disclosure.

Figure 3B:
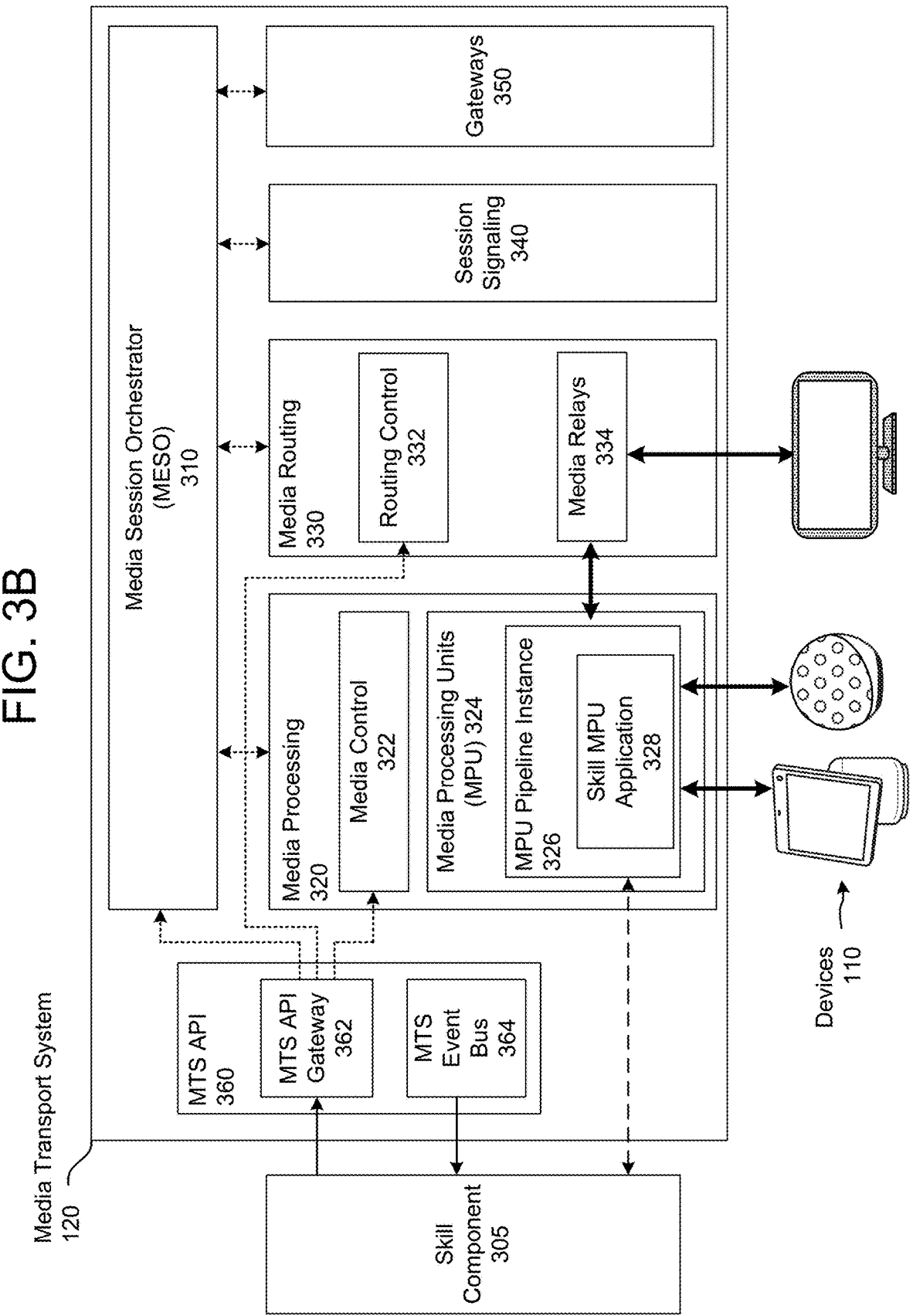

FIGS. 3A-3B illustrate example component diagrams of a media transport system configured to perform media processing according to embodiments of the present disclosure. As illustrated in FIG. 3A, a skill component 305 (e.g., specific skill configured to support communication sessions on the device 110) may interact with a media transport system 120 to request and utilize resources available within the media transport system 120. For example, the skill component 305 may correspond to an application (e.g., process, skill, and/or the like) running on a local device (e.g., device 110) and/or one or more servers, and the skill component 305 may enable a user 5 to interact with the media transport system 120 to initiate and manage a communication session involving media processing, although the disclosure is not limited thereto. To illustrate an example, the user 5 may input a command to an application programming interface (API) for the skill component 305 that is running on the device 110. The device 110 may send a request corresponding to the command to the one or more servers associated with the skill component 305 and the one or more servers may send the request to the media transport system 120.

In some examples, the skill component 305 may be developed (e.g., programmed) by an internal client or other development team (e.g., developer, programmer, and/or the like) to perform specific functionality. Thus, the skill component 305 may be designed to utilize specific resources available within the media transport system 120 and a finished product is made available to the public (e.g., end-user such as user 5). For example, the skill component 305 may enable the user 5 to initiate and/or participate in a communication session (e.g., group conference call, such as videoconferencing), to consume media content (e.g., streaming video data) with unique functionality or processing, and/or perform additional functionality (e.g., perform computer vision processing on image data, speech processing on audio data, machine learning, and/or the like) without departing from the disclosure. In this example, the media transport system 120 provides a simplified interface that enables the internal client to utilize resources within the skill component 305, but the interface and/or resources are not visible to and/or customizable by the end-user that uses the skill component 305.

The disclosure is not limited thereto, however, and in other examples the skill component 305 may be made available for external development to third party clients and/or to individual users. Thus, the media transport system 120 may provide a simplified interface for unique programming without technical expertise. For example, an individual user 5 may customize the skill component 305 using a drag and drop graphical user interface (GUI) to enable unique functionality, enabling the user 5 to program custom routines, skills, and/or the like. To illustrate an example, the user 5 may customize the skill component 305 to receive image data generated by an image sensor, process the image data using computer vision, and then perform specific action(s). For example, the skill component 305 may be programmed so that when a device (e.g., doorbell camera) detects motion and captures image data, the skill component 305 processes the image data using facial recognition to detect authorized users (e.g., family members or other invited guests) and either performs a first action (e.g., unlock the front door when an authorized user is detected) or performs a second action (e.g., send a notification to the user 5 including image data representing an unauthorized user). Thus, the interface and/or resources associated with the media transport system 120 may be visible to and/or customizable by the end-user that uses the skill component 305 without departing from the disclosure.

To enable the skill component 305 to request and utilize resources from within the media transport system 120, the media transport system 120 may include a media session orchestrator (MESO) component 310 configured to coordinate (e.g., define, establish, manage, etc.) a communication session (e.g., media session).

As illustrated in FIG. 3A, the MESO component 310 may interface between components that fall within four distinct categories: media processing components 320, media routing components 330, session signaling components 340, and/or gateway components 350.

Media processing components 320 refers to processing media content to enable unique functionality. For example, the media transport system 120 may provide a hosted back-end that performs media processing on individual streams of data, enabling the skill component 305 to define and control how media content is processed by the media transport system 120. The media processing components 320 may correspond to real time processing (e.g., data is processed during run-time, such as while streaming video to a user 5, during a videoconference, and/or the like) or offline processing (e.g., data is processed and stored in a database for future requests, such as during batch processing) without departing from the disclosure.

The media processing components 320 may include at least one media control component 322 and/or at least one media processing unit (MPU) 324 (e.g., first MPU 324a, second MPU 324b, etc.). The media control component 322 may coordinate media processing by sending control data to and/or receiving control data from other components within the media transport system 120. For example, the MESO component 310 may send a request to the media control component 322 to launch a specific application (e.g., skill, process, etc.) to perform media processing and the media control component 322 may send an instruction to a corresponding MPU 324.

The MPU 324 may be configured to perform media processing to enable additional functionality. Thus, the MPU 324 may receive first data and process the first data to generate second data. As part of performing media processing, the MPU 324 may perform speech processing on audio data and/or image data, perform computer vision processing on image data, modify audio data and/or image data, apply visual effects (e.g., overlay or other graphical element(s)) to image data, and/or the like to enable interesting functionality without departing from the disclosure. For example, the MPU 324 may generate subtitles (e.g., text data) corresponding to speech represented in image data, may translate the subtitles to a different language, may perform text-to-speech processing to enable additional functionality (e.g., describing visual cues for someone that is visually impaired, replacing dialog with speech in a different language, etc.), may perform voice recognition to identify voices represented in audio data, may perform facial recognition to detect and/or identify faces represented in image data, may perform object recognition to detect and/or identify objects represented in image data, may add a graphical overlay to image data (e.g., censoring portions of the image data, adding symbols or cartoons to the image data, etc.), may perform other processing to media content (e.g., colorize black and white movies), and/or the like without departing from the disclosure.

In some examples, the media transport system 120 may perform media processing using two or more MPUs 324. For example, the media transport system 120 may perform first media processing using a first MPU 324a and perform second media processing using a second MPU 324b. To illustrate an example, a communication session may correspond to a video chat implementation that includes image data and audio data and the media transport system 120 may perform media processing in parallel. For example, the media transport system 120 may separate the image data and the audio data, performing first media processing on the image data and separately performing second media processing on the audio data, before combining the processed image data and the processed audio data to generate output data. However, the disclosure is not limited thereto, and in other examples the media transport system 120 may perform media processing in series without departing from the disclosure. For example, the media transport system 120 may process first image data using the first MPU 324a (e.g., first media processing) to generate second image data and may process the second image data using the second MPU 324b (e.g., second media processing) to generate output image data. Additionally or alternatively, the media transport system 120 may perform multiple media processing steps using a single MPU 324 (e.g., more complex media processing) without departing from the disclosure.

The media transport system 120 may include media routing components 330 that are configured to route media (e.g., send data packets) to and from the device(s) 110 via the network(s) 199. For example, the media routing components 330 may include one or more routing control components 332, media relay components 334, point of presence selection components 336, geographic selection components 337, and/or capability selection components 338. Examples of media relay components may include a Session Traversal of User Datagram Protocol (UDP) Through Network Address Translators (NATs) system (e.g., STUN system) and/or a Traversal Using relays around NAT (TURN) system, although the disclosure is not limited thereto. While FIG. 3A illustrates the media routing components 330 including the point of presence selection components 336, geographic selection components 337, and/or capability selection components 338 as separate components, this is for ease of illustration and the disclosure is not limited thereto. Instead, a single component may perform point of presence selection, geographic selection, and/or capability selection without departing from the disclosure.

In some examples, the media transport system 120 may separate the MPUs 324 from the network(s) 199 so that the MPUs 324 do not have a publicly accessible internet protocol (IP) address (e.g., cannot route outside of a local network). Thus, the system 100 may use the media relay components 334 to send the first data from a first device to the MPUs 324 and/or the second data (e.g., processed data) generated by the MPUs 324 from the MPUs 324 to a second device. For example, an individual device 110 may be associated with a specific TURN server, such that the system 100 may route data to and from the first device using a first TURN server and route data to and from the second device using a second TURN server.

While the example described above illustrates routing data to and from the media processing components 320, the media routing components 330 may be used to route data separately from the media processing components 320 without departing from the disclosure. For example, the system 100 may route data directly between devices 110 using one or more TURN servers (e.g., TURN system) without departing from the disclosure. Additionally or alternatively, the system 100 may route data using one or more STUN servers (e.g., STUN system), such as when a device 110 has a publicly accessible IP address. In some examples, the system may establish communication sessions using a combination of the STUN system and the TURN system without departing from the disclosure. For example, a communication session may be more easily established/configured using the TURN system, but may benefit from latency improvements using the STUN system. Thus, the system 100 may route data using the STUN system, the TURN system, and/or a combination thereof without departing from the disclosure.

In addition to routing data, the media routing components 330 also perform topology optimization. For example, the media routing components 330 may include geographically distributed media relay components (e.g., TURN/STUN servers) to enable the media transport system 120 to efficiently route the data packets. For example, the media routing components 330 may include a control plane that coordinates between the media relay components to select an optimum route (e.g., data path) to send the data packets. To illustrate an example, the media routing components 330 may determine a location of parties in a communication session and determine a data path that bypasses a particular country or chokepoint in the data network. In some examples, the media routing components 330 may select an enterprise specific route and only use specific connected links associated with the enterprise. Additionally or alternatively, the routing components 330 may apply machine learning models to further reduce latency by selecting the optimum route using non-geographical parameters (e.g., availability of servers, time of day, previous history, etc.).

While the description of the media relay components 334 refers to the STUN system and/or the TURN system, the disclosure is not limited thereto. Instead, the media routing components 330 may use any alternative systems known to one of skill in the art to route the data packets. For example, the media routing components 330 may use any technique that routes UDP data packets and allows the UDP data packets to traverse the NATs without departing from the disclosure. To illustrate an example, the media routing components 330 may include UDP packet forwarding and relay devices instead of the TURN system without departing from the disclosure.

The media transport system 120 may include session signaling components 340 (e.g., edge signaling, signaling network, etc.) that may be configured to coordinate signal paths (e.g., routing of data packets) and/or a type of data packets sent between the devices 110 and server(s) within the media transport system 120. For example, the session signaling components 340 may enable the devices 110 to coordinate with each other to determine how data packets are sent between the devices 110. In some examples, a signal path may correspond to a routing table that indicates a particular route or network addresses with which to route data between two devices, although the disclosure is not limited thereto. As illustrated in FIG. 3A, the session signaling components 340 may support protocols including Session Initiation Protocol (SIP) 341, Real-Time Communication (RTC) protocol 342 (e.g., WebRTC protocol), Alexa Voice Service (AVS) protocol 343 or other voice user interface protocols, Extensible Messaging and Presence Protocol (XMPP) 344, IP Multimedia Core Network Subsystem (IMS) 345, H.323 standard 346, and/or the like, although the disclosure is not limited thereto.

The media transport system 120 may include gateway components 350 that enable the media transport system 120 to interface with (e.g., send/receive media content or other data) external networks. As illustrated in FIG. 3A, the gateway components 350 may include a public switched telephone network (PSTN) gateway 352, a mobile carrier gateways 354, a social networking gateway 356, an IP communication network gateway 358, and/or other gateways known to one of skill in the art. While FIG. 3A illustrates the gateway components 350 including a single gateway for each external network, this is intended for illustrative purposes only and the gateway components 350 may include multiple gateways for each external network without departing from the disclosure. For example, the gateway components 350 may include multiple PSTN gateways 352 having different locations without departing from the disclosure. Additionally or alternatively, a single type of external network may correspond to multiple external networks without departing from the disclosure. For example, the gateway components 350 may include a first mobile carrier gateway 354 corresponding to a first mobile carrier network and a second mobile carrier gateway 354b corresponding to a second mobile carrier network without departing from the disclosure. However, the disclosure is not limited thereto and two or more mobile carrier networks may share a mobile carrier gateway 354 without departing from the disclosure.

To illustrate an example of using the gateway components 350, the system 100 may use the PSTN gateway 352 to establish a communication session with a PSTN device (e.g., wired/wireless telephone, cellular phone, and/or the like that is associated with a PSTN telephone number) using the PSTN. For example, the system 100 may use the session signaling components 340 to send SIP data packets from a device 110 to a PSTN gateway 352. The PSTN gateway 352 may receive the SIP data packets, convert the SIP data packets to audio data in a different format, and send the audio data to the PSTN device via the PSTN. Thus, the gateway components 350 may include a plurality of gateways, with each gateway being associated with a specific external network and configured to act as an interface between the media transport system 120 and the external network.

FIG. 3B illustrates an example of signal paths and data flow between components within the media transport system 120. As illustrated in FIG. 3B, the skill component 305 may send data to a media transport system (MTS) application programming interface (API) 360. The MTS API 360 may include an MTS API gateway component 362 that receives the data (e.g., request) and sends data to the MESO component 310, the media processing components 320, the media routing components 330, and/or other components. For example, FIG. 3B illustrates the MTS API gateway component 362 communicating with the MESO component 310, the media control component 322, and the routing control component 332.

As described above with regard to FIG. 3A, the MESO component 310 may communicate with the media processing components 320, the media routing components 330, the session signaling components 340, and/or the gateway components 350. Internal signaling within the media transport system 120 is represented in FIG. 3B as dotted lines.

The components within the media transport system 120 may process the request received from the MTS API gateway 362 and send data to the MTS API 360 in response to processing the request. For example, components within the media transport system 120 may send data to an MTS event bus 364 of the MTS API 360 and the MTS event bus 364 may send data (e.g., event, notification, etc.) to the skill component 305. Data sent as part of the MTS interface between the skill component 305 and the media transport system 120 is represented in FIG. 3B using a solid line.

As illustrated in FIG. 3B, the skill component 305 may communicate with the MPU 324. For example, the skill component 305 may communicate with an MPU pipeline instance 326 running within the MPU 324 that includes a skill MPU application 328. Thus, the skill component 305 may communicate directly with the skill MPU application as part of an application interface, which is represented as a dashed line in FIG. 3B. In addition to communicating with the skill component 305, the MPU pipeline instance 326 may send data (e.g., media content) to the devices 110, either directly or via the media relay components 334.

As used herein, an MPU pipeline instance or any other instance may refer to a specific component that is executing program code; all of the logic associated with the media processing unit is running in memory in a single host, which decreases latency associated with the media processing. For example, conventional techniques for executing asynchronous workflows perform checkpointing to store data in storage components between events. Thus, when a new event occurs, the conventional techniques retrieve the stored session and loads data into the memory, resulting in a large amount of latency. As part of reducing the latency, the media transport system 120 may use the MESO component 310 to route triggers and events directly to the MPU pipeline instance that is performing the media processing, enabling the media transport system 120 to perform media processing in real-time.

Using the MESO component 310, the media transport system 120 allows skills and/or applications to enable unique functionality without requiring the skill/application to independently develop and/or program the functionality. Thus, the media transport system 120 may offer media processing operations as a service to existing skills/applications. For example, the media transport system 120 may enable a skill to provide closed captioning or other features without building a closed captioning service. Instead, the media transport system 120 may route a communication session through an MPU 324 configured to perform closed captioning. Thus, an MPU 324 configured to enable a specific feature may be utilized to enable the feature on multiple skills without departing from the disclosure.

As the MESO component 310 is capable of executing requests and commands with low latency, the media transport system 120 may utilize multiple components within a single communication session. For example, the media transport system 120 may combine multiple different components (e.g., MPUs 324 associated with one or more skills) to piece together a custom implementation enabling a combination of existing features. To illustrate an example, the media transport system 120 may build back to back SIP user engine that is customizable for a specific implementation. Thus, the MESO component 310 may mix and match different components and/or features to provide a customized experience.

Figure 4A:
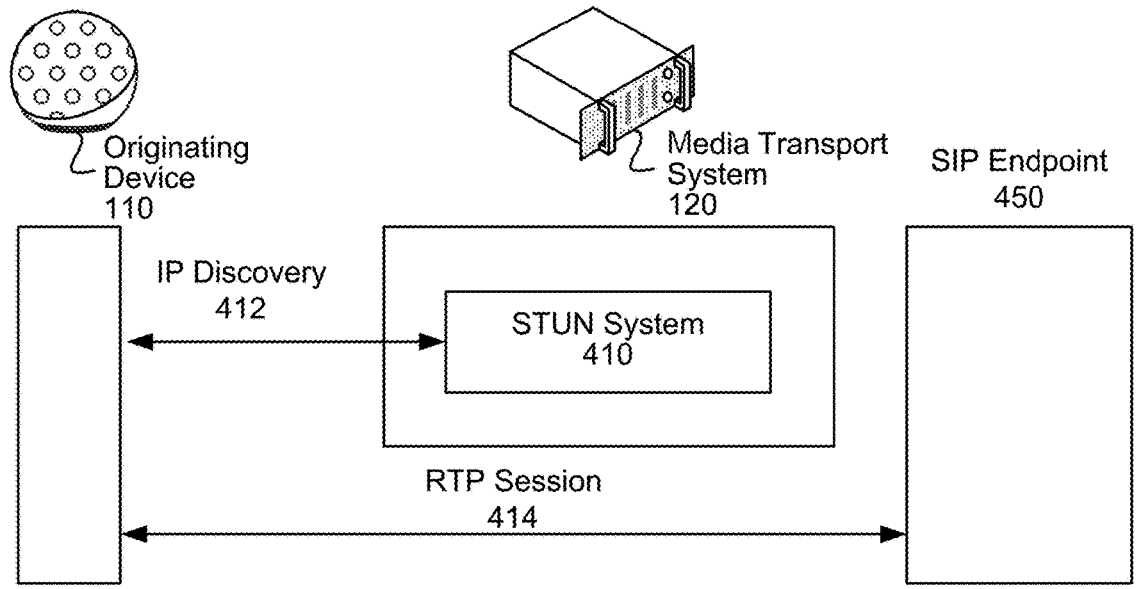
FIGS. 4A-4B illustrate examples of establishing media connections between devices according to embodiments of the present disclosure.
Figure 4B:
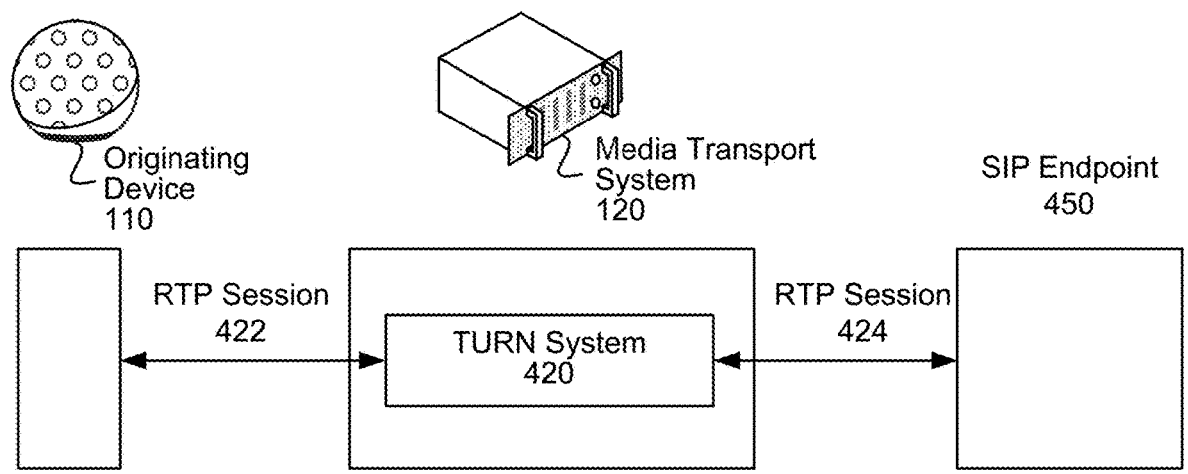

FIGS. 4A-4B illustrate examples of establishing media connections between devices according to embodiments of the present disclosure. In some examples, an originating device 110 may have a publicly accessible IP address and may be configured to establish a real-time transport (RTP) protocol communication session directly with a SIP endpoint 450. The SIP endpoint 450 may correspond to a device 110, a component within the media transport system 120, a gateway component configured to interface with a remote network, and/or a device associated with the remote network itself. To enable the originating device 110 to establish the RTP communication session, the media transport system 120 may include Session Traversal of User Datagram Protocol (UDP) Through Network Address Translators (NATs) system (e.g., STUN system 410). The STUN system 410 may be configured to allow NAT clients (e.g., an originating device 110 behind a firewall) to setup calls to a Voice over Internet Protocol (VoIP) provider hosted outside of the local network by providing a public IP address, the type of NAT they are behind, and a port identifier associated by the NAT with a particular local port. As illustrated in FIG. 4A, the originating device 110 may perform (412) IP discovery using the STUN system 410 and may use this information to set up an RTP communication session 414 (e.g., UDP communication) between the originating device 110 and the SIP endpoint 450 to establish a call.

In some examples, the originating device 110 may not have a publicly accessible IP address. For example, in some types of NAT the originating device 110 cannot route outside of the local network. To enable the originating device 110 to establish an RTP communication session, the media transport system 120 may include Traversal Using relays around NAT (TURN) system 420. The TURN system 420 may be configured to connect the originating device 110 to the SIP endpoint 450 when the originating device 110 is behind a NAT. As illustrated in FIG. 4B, the originating device 110 may establish (422) an RTP session with the TURN system 420 and the TURN system 420 may establish (424) an RTP session with the SIP endpoint 450. Thus, the originating device 110 may communicate with the SIP endpoint 450 via the TURN system 420. For example, the originating device 110 may send audio data and/or image data to the media transport system 120 and the media transport system 120 may send the audio data and/or the image data to the SIP endpoint 450. Similarly, the SIP endpoint 450 may send audio data and/or image data to the media transport system 120 and the media transport system 120 may send the audio data and/or the image data to the originating device 110.

In some examples, the system may establish communication sessions using a combination of the STUN system 410 and the TURN system 420 without departing from the disclosure. For example, a communication session may be more easily established/configured using the TURN system 420, but may benefit from latency improvements using the STUN system 410. Thus, the system may use the STUN system 410 when the communication session may be routed directly between two devices and may use the TURN system 420 for all other communication sessions. Additionally or alternatively, the system may use the STUN system 410 and/or the TURN system 420 selectively based on the communication session being established. For example, the system may use the STUN system 410 when establishing a communication session between two devices (e.g., point-to-point) within a single network (e.g., corporate LAN and/or WLAN), but may use the TURN system 420 when establishing a communication session between two devices on separate networks and/or three or more devices regardless of network(s).

When the communication session goes from only two devices to three or more devices, the system may need to transition from the STUN system 410 to the TURN system 420. Thus, if the system anticipates three or more devices being included in the communication session, the communication session may be performed using the TURN system 420. Similarly, when the communication session goes from three or more devices to only two devices, the system may need to transition from the TURN system 420 to the STUN system 410.

While FIGS. 4A-4B illustrate an RTP communication session being established between the originating device 110 and the SIP endpoint 450, the present disclosure is not limited thereto and the RTP communication session may be established between the originating device 110 and a gateway component or other device associated with the SIP endpoint 450 without departing from the present disclosure. Additionally or alternatively, while FIGS. 4A-4B illustrate examples of enabling communication sessions using the SIP protocol, the disclosure is not limited thereto and the media transport system 120 may use any protocols known to one of skill in the art.

While FIGS. 4A-4B illustrate examples of enabling communication sessions using a data connection (e.g., using Voice over Internet Protocol (VoIP), session initiation protocol (SIP), and/or the like), the disclosure is not limited thereto and the system 100 may enable communication sessions using any type of network without departing from the disclosure. For example, the media transport system 120 may enable communication sessions using a cellular connection (e.g., mobile phone network) or other external network without departing from the disclosure. For example, the media transport system 120 may send instructions (e.g., command data) to endpoints (e.g., caller devices, such as the device 110) instructing the endpoint to establish a communication session (e.g., dial a telephone number) in response to the voice command.

Figure 5:
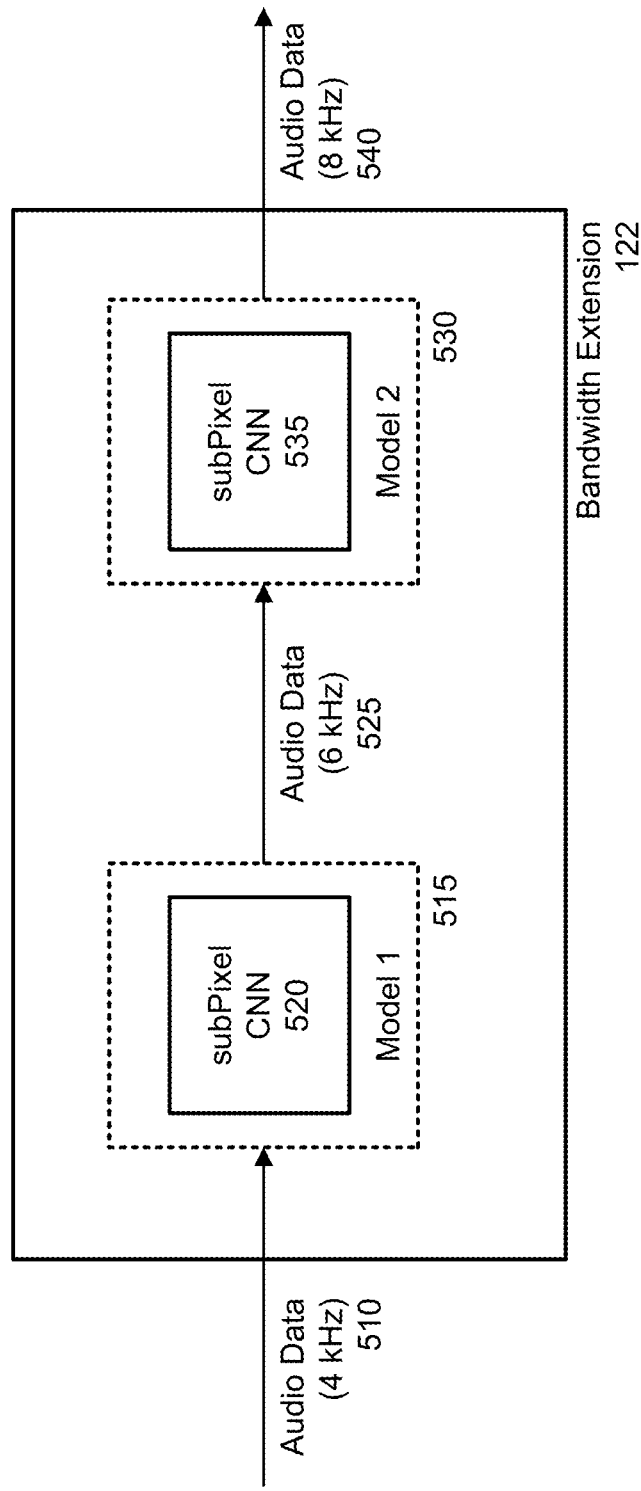
FIG. 5 illustrates an example component diagram for performing bandwidth extension according to embodiments of the present disclosure.

FIG. 5 illustrates an example component diagram for performing bandwidth extension according to embodiments of the present disclosure. As illustrated in FIG. 5, the bandwidth extension component 122 may receive first audio data 510 having a 4 kHz bandwidth (e.g., the first audio data 510 represents first audio in a first frequency range equal to 4 kHz) and may perform bandwidth extension 500 to extend the speech bandwidth from 4 kHz to 8 kHz. For example, FIG. 5 illustrates that the bandwidth extension component 122 may include two trained models in series and that these cascaded models may perform the bandwidth extension 500 in two stages.

In the example illustrated in FIG. 5, a first model 515 may correspond to a first subpixel convolutional neural network (CNN) 520. In a first stage, the first subpixel CNN 520 may receive the first audio data 510 and may be configured to generate second audio data 525 having a 6 kHz bandwidth (e.g., the second audio data 525 represents second audio in a second frequency range equal to 6 kHz).

The first subpixel CNN 520 may output the second audio data 525 to a second model 530, which may correspond to a second subpixel CNN 535. In a second stage, the second subpixel CNN 535 may receive the second audio data 525 and may be configured to generate third audio data 540 having an 8 kHz bandwidth (e.g., the third audio data 540 represents third audio in a third frequency range equal to 8 kHz). The bandwidth extension component 122 may output the third audio data 540 generated by the second subpixel CNN 535, although the disclosure is not limited thereto and the bandwidth extension component 122 may include additional stages without departing from the disclosure.

While FIG. 5 illustrates the first model 515 and the second model 530 corresponding to subpixel CNNs, the disclosure is not limited thereto and the first model 515 and/or the second model 530 may correspond to other neural networks without departing from the disclosure. Additionally or alternatively, the first subpixel CNN 520 may be different from the second subpixel CNN 535, although the disclosure is not limited thereto. For example, as will be described in greater detail below with regard to FIGS. 8A-8B, in some examples the first subpixel CNN 520 may include the same number of processing blocks as the second subpixel CNN 535, but the type of layers and/or the parameters used by the individual processing blocks may be different between the first subpixel CNN 520 and the second subpixel CNN 535. However, the disclosure is not limited thereto, and the type of layers and/or the parameters may be identical or the number of processing blocks may be different between the first subpixel CNN 520 and the second subpixel CNN 535 without departing from the disclosure.

As described above, in some examples the first audio data 510 may be a narrowband signal having a 4 kHz speech bandwidth, meaning that the first audio data 510 represents first audio that is within a first frequency range equal to 4 kHz. For example, the first audio may include frequency components ranging from 0 Hz to 4 kHz, although the disclosure is not limited thereto and the first audio may include frequency components ranging from 200 Hz to 4.2 kHz without departing from the disclosure. However, this is intended to illustrate a conceptual example, and the actual bandwidth and/or frequency range may vary without departing from the disclosure. For example, some narrowband signals (e.g., telephone quality speech) may include frequency components ranging from 200 Hz to 3.2 kHz (e.g., 3 kHz speech bandwidth), 300 Hz to 3.4 kHz (e.g., 3.1 kHz speech bandwidth), 200 Hz to 3.7 kHz (3.5 kHz speech bandwidth), and/or the like without departing from the disclosure.

Similarly, in some examples the second audio data 525 may have a 6 kHz speech bandwidth, meaning that the second audio data 525 represents second audio that is within a second frequency range equal to 6 kHz. For example, the second audio may include frequency components ranging from 0 Hz to 6 kHz, although the disclosure is not limited thereto and the second audio may include frequency components ranging from 200 Hz to 6.2 kHz without departing from the disclosure. However, this is intended to illustrate a conceptual example, and the actual bandwidth and/or frequency range may vary without departing from the disclosure. For example, in other examples the second audio data 525 may include frequency components ranging from 200 Hz to 5.2 kHz (e.g., 5 kHz speech bandwidth), from 0 Hz to 5.9 kHz (e.g., 5.9 kHz speech bandwidth), from 0 Hz to 6.1 kHz (e.g., 6.1 kHz speech bandwidth), and/or the like without departing from the disclosure.

In some examples, the third audio data 540 may be a wideband signal having an 8 kHz speech bandwidth, meaning that the third audio data 540 represents third audio that is within a third frequency range equal to 8 kHz. For example, the third audio may include frequency components ranging from 0 Hz to 8 kHz, although the disclosure is not limited thereto and the third audio may include frequency components ranging from 200 Hz to 8.2 kHz without departing from the disclosure. However, this is intended to illustrate a conceptual example, and the actual bandwidth and/or frequency range may vary without departing from the disclosure. For example, in other examples the third audio data 540 may include frequency components ranging from 200 Hz to 8.2 kHz (e.g., 8 kHz speech bandwidth), from 0 Hz to 7.9 kHz (e.g., 7.9 kHz speech bandwidth), from 0 Hz to 8.1 kHz (e.g., 8.1 kHz speech bandwidth), and/or the like without departing from the disclosure.

In some examples, the first audio data 510, the second audio data 525, and/or the third audio data 540 may share the same sampling rate. For example, all three signals may have a fixed sampling rate (e.g., 8 kHz, 16 kHz, etc.) without departing from the disclosure. However, the disclosure is not limited thereto and the first audio data 510 may have a first sampling rate (e.g., 8 kHz) while the second audio data 525 and/or the third audio data 540 may have a second sampling rate (e.g., 16 kHz) without departing from the disclosure.

While the first audio data 510 may have a sampling rate higher than 4 kHz, the first audio data 510 may only represent speech content within the first frequency range (e.g., 0-4 kHz). For example, the first audio data 510 may only include first frequency components within a first range (e.g., 0-4 kHz frequency range), whereas the second audio data 525 may include the first frequency components along with second frequency components within a second range (e.g., 4-6 kHz frequency range). Further, the third audio data 540 may include the first frequency components and the second frequency components, along with third frequency components within a third range (e.g., 6-8 kHz frequency range). Thus, the third audio data 540 extends the frequency range in which speech content is represented, transmitting deeper and higher speech tones using a wider frequency spectrum to achieve better voice quality.

While FIG. 5 illustrates an example of the bandwidth extension component 122 including two stages and being configured to generate a wideband signal with an 8 kHz speech bandwidth, the disclosure is not limited thereto. In some examples, the bandwidth extension component 122 may include additional stages (e.g., three or more stages) and/or may be configured to generate output audio data that has a speech bandwidth greater than 8 kHz (e.g., 10 kHz, 12 kHz, and/or the like) without departing from the disclosure. Additionally or alternatively, while FIG. 5 illustrates an example of the bandwidth extension component 122 including two stages configured to perform uniform bandwidth extension (e.g., the first model 515 and the second model 530 each extend the bandwidth by 2 kHz), the disclosure is not limited thereto and each stage of the bandwidth extension component 122 may perform varying amounts of bandwidth extension without departing from the disclosure.

Figure 6:
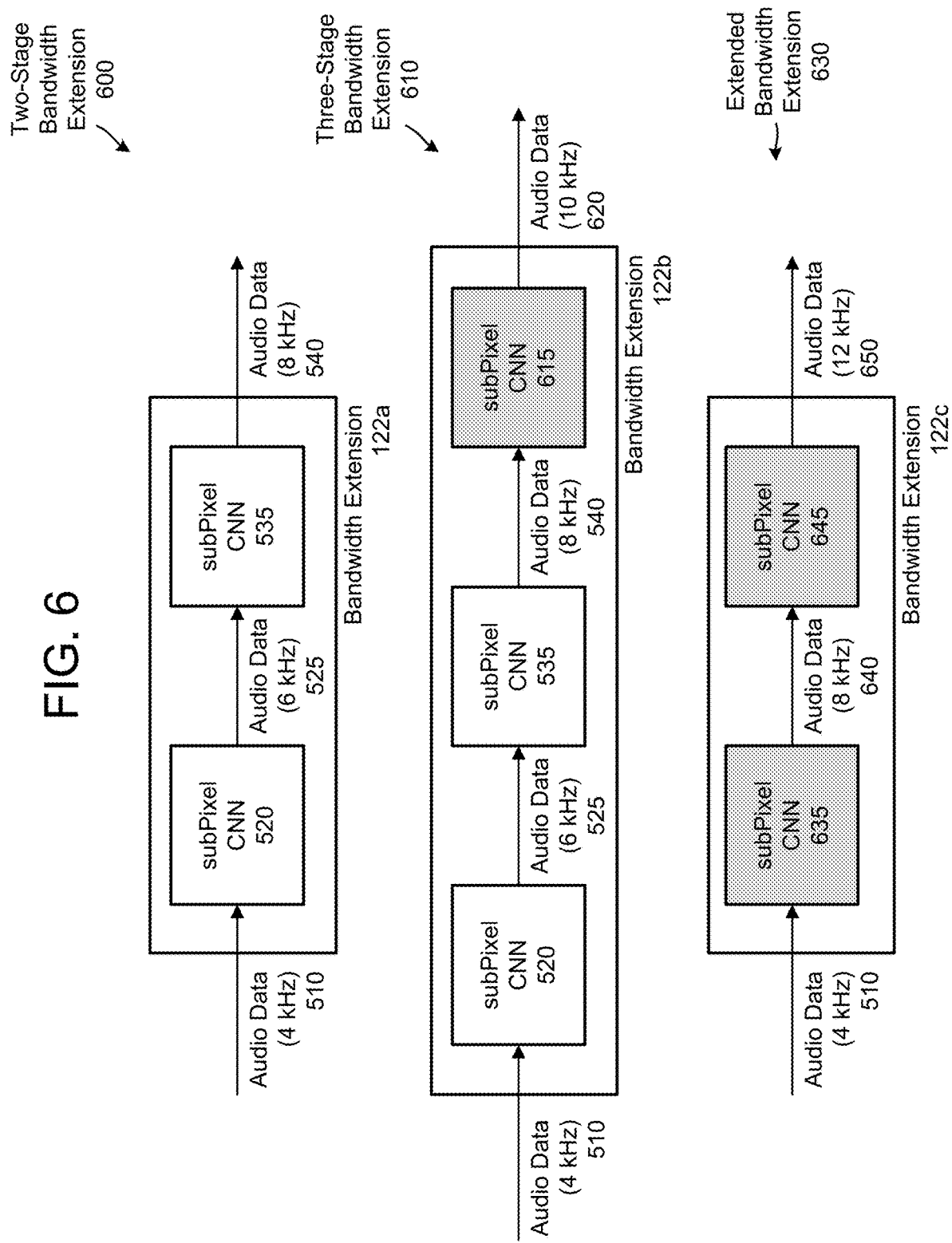
FIG. 6 illustrates example component diagrams for performing bandwidth extension according to embodiments of the present disclosure.

FIG. 6 illustrates example component diagrams for performing bandwidth extension according to embodiments of the present disclosure. As illustrated in FIG. 6, a first bandwidth extension component 122a may perform two-stage bandwidth extension 600, as described above with regard to FIG. 5. For example, the first bandwidth extension component 122a may include the first subpixel CNN 520 and the second subpixel CNN 535 and may generate the third audio data 540 having an 8 kHz bandwidth (e.g., the third audio data 540 represents third audio in a third frequency range equal to 8 kHz).

The disclosure is not limited thereto, however, and in some examples a second bandwidth extension component 122b may perform three-stage bandwidth extension 610 without departing from the disclosure. For example, the second bandwidth extension component 122b may include the first subpixel CNN 520, the second subpixel CNN 535, and a third subpixel CNN 615. The third subpixel CNN 615 may receive the third audio data 540 and may generate fourth audio data 620 having a 10 kHz bandwidth (e.g., the fourth audio data 615 represents fourth audio in a fourth frequency range equal to 10 kHz).

While not illustrated in FIG. 6, the bandwidth extension component 122 is not limited thereto and may include any number of additional stages (e.g., additional subpixel CNNs) without departing from the disclosure. For example, in some examples the bandwidth extension component 122 may include a fourth stage comprising a fourth subpixel CNN configured to receive the fourth audio data 615 and generate fifth audio data having a 12 kHz bandwidth (e.g., the fifth audio data represents fifth audio in a fifth frequency range equal to 12 kHz), although the disclosure is not limited thereto.

Additionally or alternatively, the bandwidth extension component 122 may perform varying amounts of bandwidth extension without departing from the disclosure. As illustrated in FIG. 6, in some examples a third bandwidth extension component 122c may perform extended bandwidth extension 630 without departing from the disclosure. For example, the third bandwidth extension component 122c may include a first subpixel CNN 635 configured to receive the first audio data 510 and generate second audio data 640 having an 8 kHz bandwidth (e.g., the second audio data 640 represents sixth audio in a sixth frequency range equal to 8 kHz). In addition, the third bandwidth extension component 122c may include a second subpixel CNN 645 configured to receive the second audio data 640 and generate third audio data 650 having a 12 kHz bandwidth (e.g., the third audio data 650 represents seventh audio in a seventh frequency range equal to 12 kHz). However, the disclosure is not limited thereto and the number of stages and/or the speech bandwidth of the output audio data may vary without departing from the disclosure.

Figure 7:
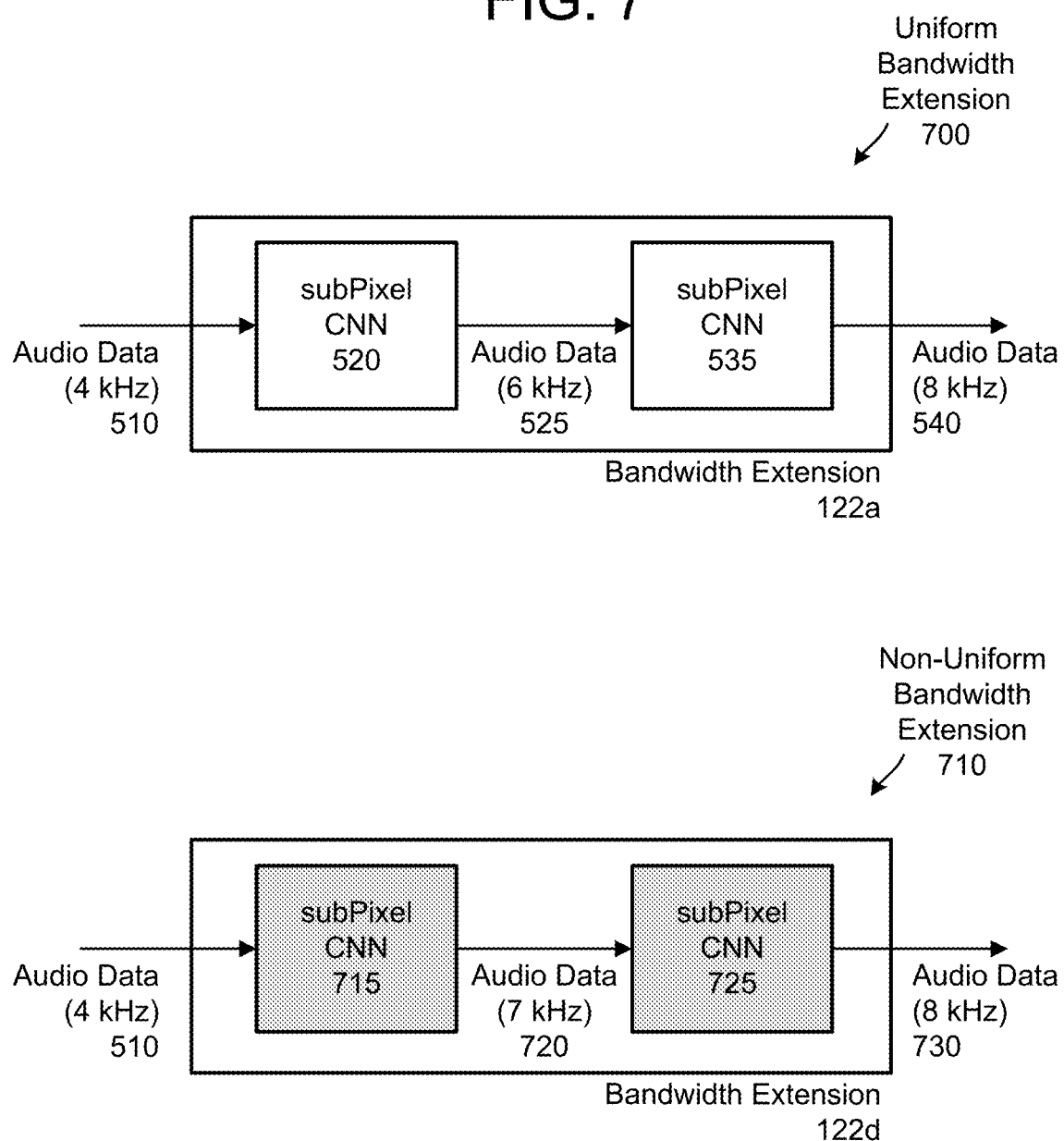
FIG. 7 illustrates example component diagrams for performing uniform and non-uniform bandwidth extension according to embodiments of the present disclosure.

FIG. 7 illustrates example component diagrams for performing uniform and non-uniform bandwidth extension according to embodiments of the present disclosure. As illustrated in FIG. 7, the first bandwidth extension component 122a may perform uniform bandwidth extension 700, as described above with regard to FIGS. 5-6. For example, the first bandwidth extension component 122a may include two stages configured to perform uniform bandwidth extension. Thus, the first subpixel CNN 520 and the second subpixel CNN 535 may both be configured to extend the bandwidth by 2 kHz, with the first subpixel CNN 520 extending the bandwidth from 4 kHz to 6 kHz and the second subpixel CNN 535 extending the bandwidth from 6 kHz to 8 kHz.

The disclosure is not limited thereto, however, and in some examples a fourth bandwidth extension component 122d may perform non-uniform bandwidth extension 710 without departing from the disclosure. For example, the fourth bandwidth extension component 122d may include two or more stages configured to perform varying amounts of bandwidth extension without departing from the disclosure.

In the non-uniform bandwidth extension 710 example illustrated in FIG. 7, the fourth bandwidth extension component 122d may include a first subpixel CNN 715 configured to receive the first audio data 510 and generate second audio data 720 having a 7 kHz bandwidth (e.g., the second audio data 720 represents eighth audio in an eighth frequency range equal to 7 kHz). In addition, the fourth bandwidth extension component 122*d* may include a second subpixel CNN 725 configured to receive the second audio data 720 and generate third audio data 730 having an 8 kHz bandwidth (e.g., the third audio data 730 represents ninth audio in a ninth frequency range equal to 8 kHz). However, the disclosure is not limited thereto and the number of stages, the amount of bandwidth extension for each stage, and/or the speech bandwidth of the output audio data may vary without departing from the disclosure.

Figure 8A:
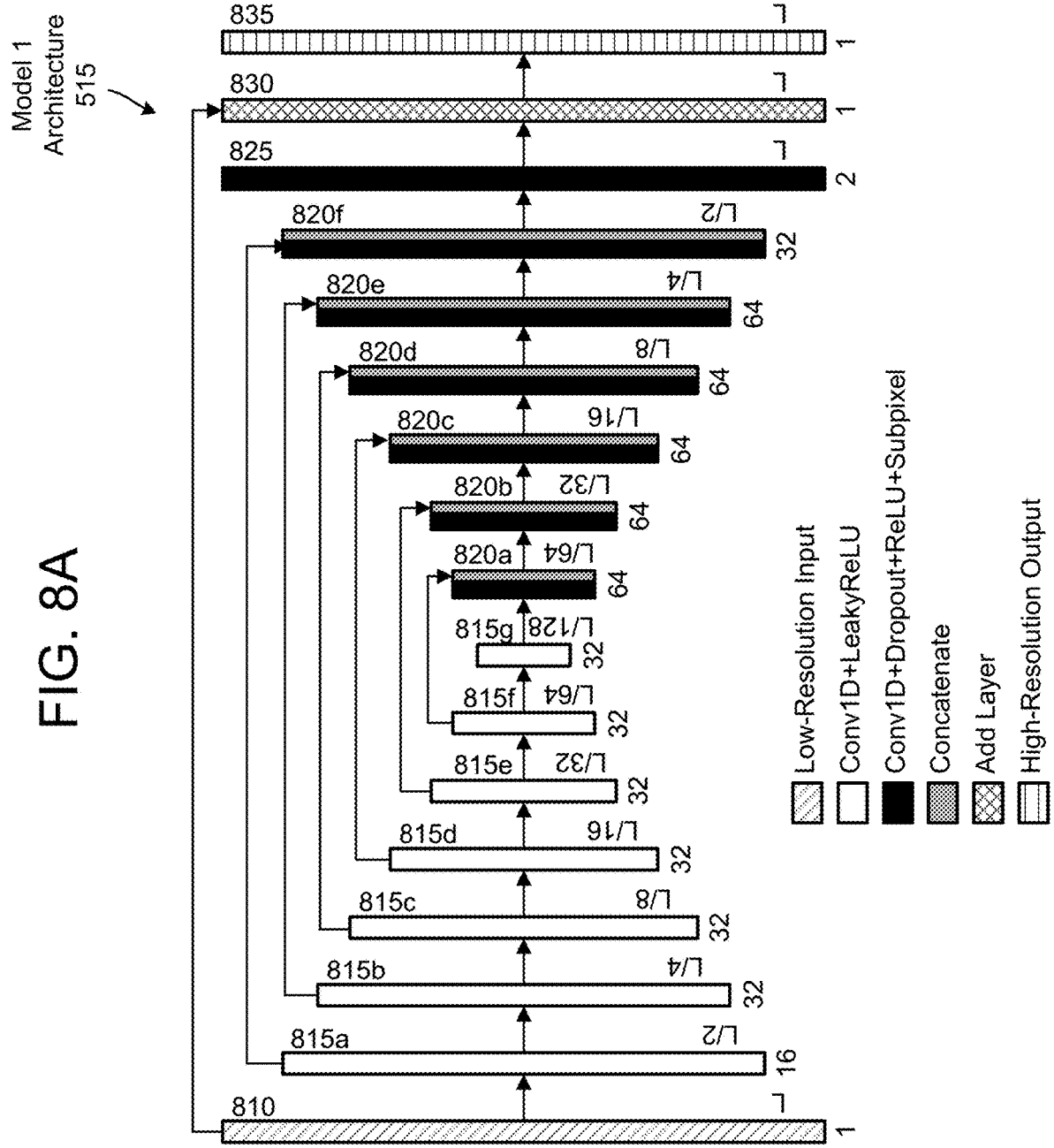
FIGS. 8A-8B illustrate examples of subpixel convolutional neural network (CNN) architecture according to embodiments of the present disclosure.
Figure 8B:
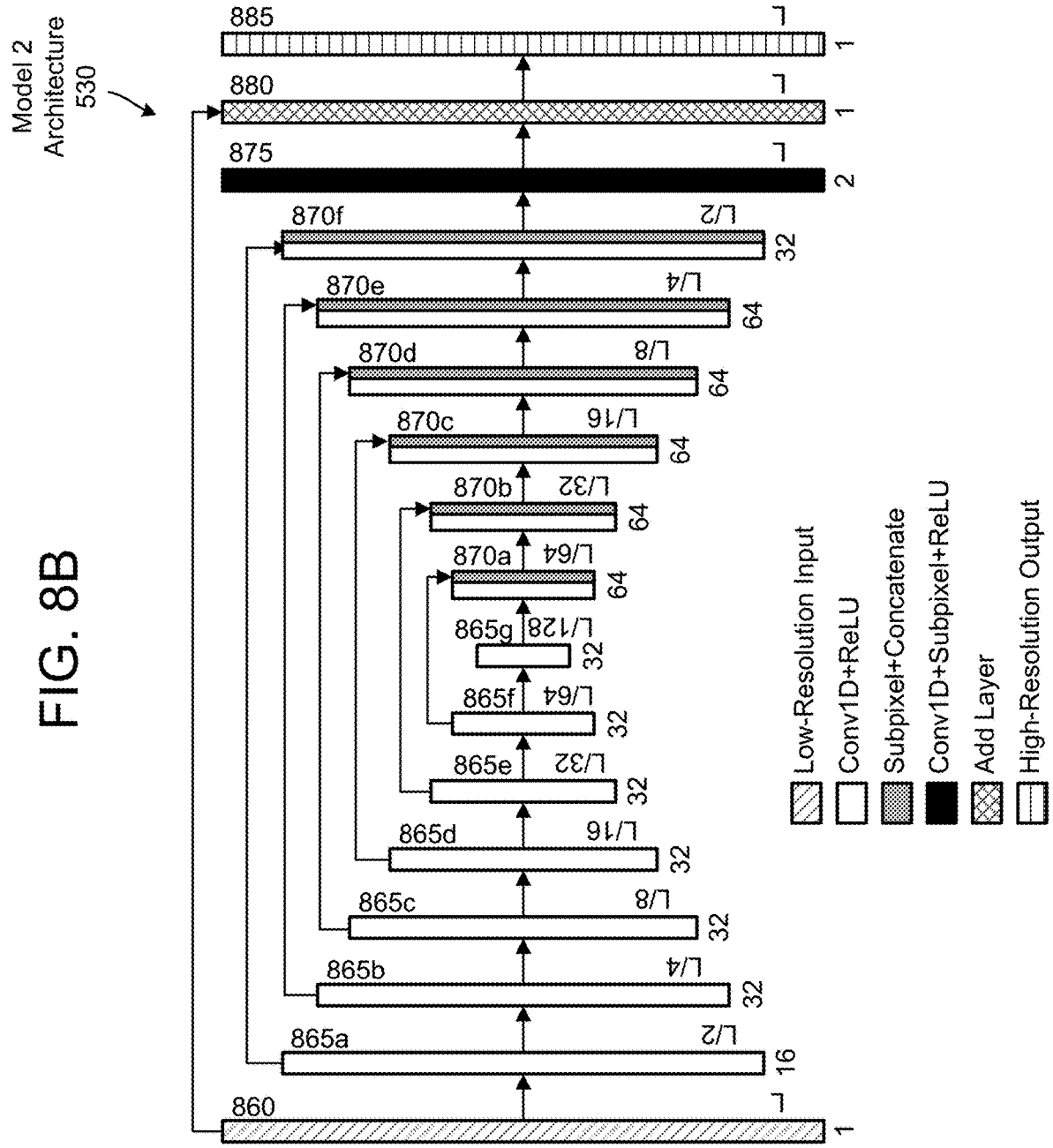

FIGS. 8A-8B illustrate examples of subpixel convolutional neural network (CNN) architecture according to embodiments of the present disclosure. For example, FIG. 8A illustrates an example of the first model (e.g., Model 1) architecture 515, whereas FIG. 8B illustrates an example of the second model (e.g., Model 2) architecture 530. However, the architecture illustrated in FIGS. 8A-8B is intended to conceptually illustrate potential examples and the disclosure is not limited thereto. Instead, a number of processing blocks, a number of layers included in an individual processing block, type(s) of layers included in an individual processing block, parameter(s) used by an individual layers, and/or the like may vary without departing from the disclosure.

As illustrated in FIG. 8A, the first model architecture 515 may include a first plurality of downsampling processing blocks 815, a second plurality of upsampling processing blocks 820/825, and an add layer 830. For example, the first model architecture 515 may receive a low-resolution input 810 that corresponds to the narrowband signal (e.g., first audio data 510) having a first frequency range (e.g., 4 kHz) and may generate a high-resolution output 835 that corresponds to a signal (e.g., second audio data 525) having a second frequency range (e.g., 6 kHz).

To generate the high-resolution output 835, the first model architecture 515 may pass the low-resolution input 810 through the plurality of downsampling processing blocks 815*a*-815*g*, with the final downsampling processing block 815*g* acting as a bottleneck layer for the first model architecture 515. For ease of explanation, the following description may refer to the downsampling processing blocks 815 as including a convolutional layer (e.g., Conv1D) and a leaky rectified linear unit (ReLU) layer (e.g., LeakyReLU, which corresponds to a rectified linear activation function). However, the disclosure is not limited thereto and the downsampling processing blocks 815 may instead be referred to as including the convolutional layer with a leaky ReLU activation function without departing from the disclosure. Thus, each of the downsampling processing blocks 815*a*-815*g* may perform a convolution operation and then generate an output using the leaky ReLU as an activation function. Additionally or alternatively, while the description above refers to the downsampling processing blocks 815 as including a convolutional layer, the disclosure is not limited thereto and an individual downsampling processing block 815 may be referred to as a downsampling layer without departing from the disclosure. For example, a downsampling processing block 815 may correspond to a single downsampling layer that is a convolutional layer (e.g., the downsampling layer performs a convolutional operation that results in downsampling) associated with an activation function (e.g., leaky ReLU).

A ReLU layer is an activation function that corresponds to a piecewise linear function that is defined to be zero for all negative values of input x and equal to a scalar multiple of x (e.g., a*x) for all positive values of the input x (e.g., ρ(x)=max(0,a*x)), where a is a learnable parameter. In some examples, a is set equal to a value of one, such that the ReLU layer sets all negative values in the input x to zero and all other values are kept constant (e.g., ρ(x)=max(0,x)), although the disclosure is not limited thereto.

In contrast, a leaky ReLU is an activation function that allows a small gradient for all negative values of input x (e.g., when the unit is not active), as shown in Equation [1]:

$$f(x) = \begin{cases} x & \text{if } x > 0, \\ 0.01x & \text{otherwise} \end{cases}. \quad [1]$$

While Equation [1] illustrates an example in which the small gradient is positive, the disclosure is not limited thereto and in some examples the gradient may be negative without departing from the disclosure. Thus, instead of setting negative values equal to a value of zero, a leaky ReLU layer may set negative values equal to a small, negative gradient without departing from the disclosure.

As illustrated in FIG. 8A, the first model architecture 515 may pass the low-resolution input 810 through six downsampling processing blocks 815*a*-815*f* and then the bottleneck layer (e.g., downsampling processing block 815*g*). The downsampling processing blocks 815 may apply a convolution operation with a stride of two, which halves the spatial dimension and doubles the filter size. After the bottleneck layer (e.g., downsampling processing block 815*g*), the first model architecture 515 may pass the signal through upsampling processing blocks 820*a*-820*f*. The upsampling processing blocks 820 may apply a convolution operation with a stride of two, which doubles the spatial dimension and halves the filter size.

For ease of explanation, the following description may refer to the upsampling processing blocks 820 as including a convolutional layer (e.g., Conv1D), a dropout layer (e.g., dropout), a ReLU layer (e.g., a rectified linear activation function), a subpixel convolutional layer (e.g., SubPixel), and a concatenate layer (e.g., Concatenate). However, the disclosure is not limited thereto and the upsampling processing blocks 820 may instead be referred to as including the convolutional layer with a ReLU activation function without departing from the disclosure. Additionally or alternatively, while the description above refers to the upsampling processing blocks 820 as including a convolutional layer, the disclosure is not limited thereto and the convolutional layer may be referred to as an upsampling layer without departing from the disclosure. For example, an upsampling processing block 820 may include an upsampling layer that is a convolutional layer (e.g., the upsampling layer performs a convolutional operation that results in upsampling) on which dropout (e.g., dropout regularization) is applied, and the upsampling layer may be associated with an activation function (e.g., ReLU).

Using this terminology, an upsampling processing block 820 may include an upsampling layer (e.g., with dropout and the ReLU activation function), followed by a subpixel convolutional layer and a concatenate layer. Thus, each of the upsampling processing blocks 820*a*-820*f* may perform a) a convolution operation, b) a dropout operation, c) generate an output using the ReLU as an activation function, d) a subpixel convolution operation to shuffle values, and e) a concatenate operation.

The subpixel convolutional layer may be configured to perform subpixel convolution to increase a spatial dimension of data being passed through the upsampling processing block 820, as described in greater detail below with regard to FIGS. 9A-9C. For example, the upsampling processing block 820 may receive input data representing features, which may be referred to as feature data, feature map data, channel data, and/or the like. The input data may correspond to a first tensor of dimension (F×d), where F indicates a number of unique filters or channels and d indicates the spatial dimensions for the channels. Thus, if the first tensor includes 64 channels having first dimensions [1×8] (e.g., a series of eight values), the first tensor has first tensor dimensions (e.g., (64×8) or (64×[1×8])).

The upsampling processing block 820 may perform a convolutional operation on the input data (e.g., first tensor) using the convolutional layer, generating a second tensor with the first tensor dimensions. The subpixel convolutional layer may receive the second tensor and may perform a one-dimensional (1D) subpixel convolutional operation to generate a third tensor having double the spatial dimensions (e.g., 2d) and half the filter size (e.g., half the number of channels, or F/2). Thus, the subpixel convolutional layer receives input data having dimensions (F×d) and generates output data having dimensions (F/2×2d). For example, the subpixel convolutional layer may combine samples from two input channels having the first dimensions [1×8] to generate a single output channel having second dimensions [1×16] (e.g., a series of sixteen values). In the example described above, the third tensor includes 32 channels having the second dimensions [1×16], meaning that the third tensor has second tensor dimensions (e.g., (32×16) or (32×[1×16])).

The concatenate layers may have skip connections with the output of corresponding downsampling processing blocks 815a-815f. For example, the first downsampling processing block 815a may have a first skip connection with the sixth upsampling processing block 820f, the second downsampling processing block 815b may have a second skip connection with the fifth upsampling processing block 820e, the third downsampling processing block 815c may have a third skip connection with the fourth upsampling processing block 820d, the fourth downsampling processing block 815d may have a fourth skip connection with the third upsampling processing block 820c, the fifth downsampling processing block 815e may have a fifth skip connection with the second upsampling processing block 820b, and the sixth downsampling processing block 815f may have a sixth skip connection with the first upsampling processing block 820a.

The skip connections enable an individual downsampling processing block 815 to send first output data (e.g., first feature map data) to the corresponding upsampling processing block 820 with which it is paired, in addition to the subsequent downsampling processing block 815. Thus, an upsampling processing block 820 may generate second output data (e.g., second feature map data) using the subpixel convolutional layer and the concatenate layer may concatenate the second output data with first output data received from the associated downsampling processing block 815 to generate output data (e.g., third feature map data).

In the example described above, the concatenate layer would receive the first feature map data (e.g., output by a downsampling processing block 815 that is associated with the upsampling processing block 820 via a skip connection) and the second feature map data (e.g., third tensor output by the subpixel convolutional layer) and perform a concatenation operation to combine the first feature map data and the second feature map data to generate the output data. For example, the concatenate layer may combine the third tensor having the second tensor dimensions (e.g., (32×16) or (32×[1×16])) with first feature map data having the second tensor dimensions to generate a fourth tensor having third tensor dimensions (e.g., (64×16) or (64×[1×16]).

As illustrated in FIG. 8A, the upsampling processing block 820a receives feature map data (e.g., (32×L/64)) output by the downsampling processing block 815f, the upsampling processing block 820b receives feature map data (e.g., (32×L/32)) output by the downsampling processing block 815e, the upsampling processing block 820c receives feature map data (e.g., (32×L/16)) output by the downsampling processing block 815d, the upsampling processing block 820d receives feature map data (e.g., (32×L/8)) output by the downsampling processing block 815c, the upsampling processing block 820e receives feature map data (e.g., (32×L/4)) output by the downsampling processing block 815b, and the upsampling processing block 820f receives feature map data (e.g., (16×L/2)) output by the downsampling processing block 815a, although the disclosure is not limited thereto.

As illustrated in FIG. 8A, the first five upsampling processing blocks 820a-820e may include 64 filters and/or use 64 channels to generate feature map data. In contrast, the sixth upsampling processing block 820f may include 32 filters and/or use 32 channels to generate feature map data. After the sixth upsampling processing block 820f generates feature map data and concatenates the feature map data with first feature map data output by the first downsampling processing block 815a to generate thirteenth feature map data, the first model architecture 515 may process the thirteenth feature map data using a seventh upsampling processing block 825. However, the seventh upsampling processing block 825 does not include a concatenate layer and is not paired with one of the downsampling processing blocks 815. Instead, the seventh upsampling processing block 825 may include 2 filters and/or use 2 channels to generate fourteenth feature map data. Finally, the first model architecture 515 may include an add layer 830 configured to add the input narrowband signal (e.g., low-resolution input 810) and the fourteenth feature map data output by the seventh upsampling processing block 825 to generate a high-resolution output 835 having a second frequency range (e.g., 6 kHz bandwidth).

As illustrated in FIG. 8A, a dropout layer is present in the upsampling processing blocks 820 to avoid overfitting. The combination of using the LeakyReLU activation functions in the downsampling processing blocks 815 and the dropout layers in the upsampling processing blocks 820 helps the first model architecture 515 to avoid distortion in the signal input. This helps the first model architecture 515 to process audio data irrespective of the input bandwidth. For example, if a narrowband signal is input to the first model architecture 515, the first model architecture 515 extends the bandwidth. However, if a wideband signal is input to the first model architecture 515, the first model architecture 515 does not distort the input wideband signal and passes it without distortion. The number of filters present in the convolutional layers is illustrated in FIG. 8A below each processing block.

FIG. 8B illustrates an example of the second model (Model 2) architecture 530. As the second model architecture 530 is similar to the first model architecture 515, a redundant description is omitted. As illustrated in FIG. 8B, the second model architecture 530 may receive a low-resolution input 860, may pass the low-resolution input 860 through a first plurality of downsampling processing blocks 865a-865g that include a convolutional layer and a ReLU layer (e.g., Conv1D+ReLU), a second plurality of upsampling processing blocks 870a-870f that include a convolutional layer, a ReLU layer, a subpixel convolutional layer, and a concatenate layer (e.g., Conv1D+ReLU+Subpixel+ Concatenate), a seventh upsampling processing block 875 that includes a convolutional layer, a subpixel layer, and a ReLU layer (e.g., Conv1D+Subpixel+ReLU), and an add layer 880 to generate a high-resolution output 885.

The add layer 880 is configured to add the low-resolution input 860 to the output of the seventh upsampling processing block 875 to generate the high-resolution output 885 having a third frequency range (e.g., 8 kHz bandwidth). Thus, the second model architecture 530 is configured to increase the bandwidth from the second frequency range (e.g., 6 kHz bandwidth) to the third frequency range (e.g., 8 kHz bandwidth). Some of the differences between the first model architecture 515 and the second model architecture 530 include that the downsampling processing blocks 865 include a ReLU activation function (e.g., instead of a Leaky ReLU activation function) and the upsampling processing blocks 870 omit the dropout layer.

Figure 9C:
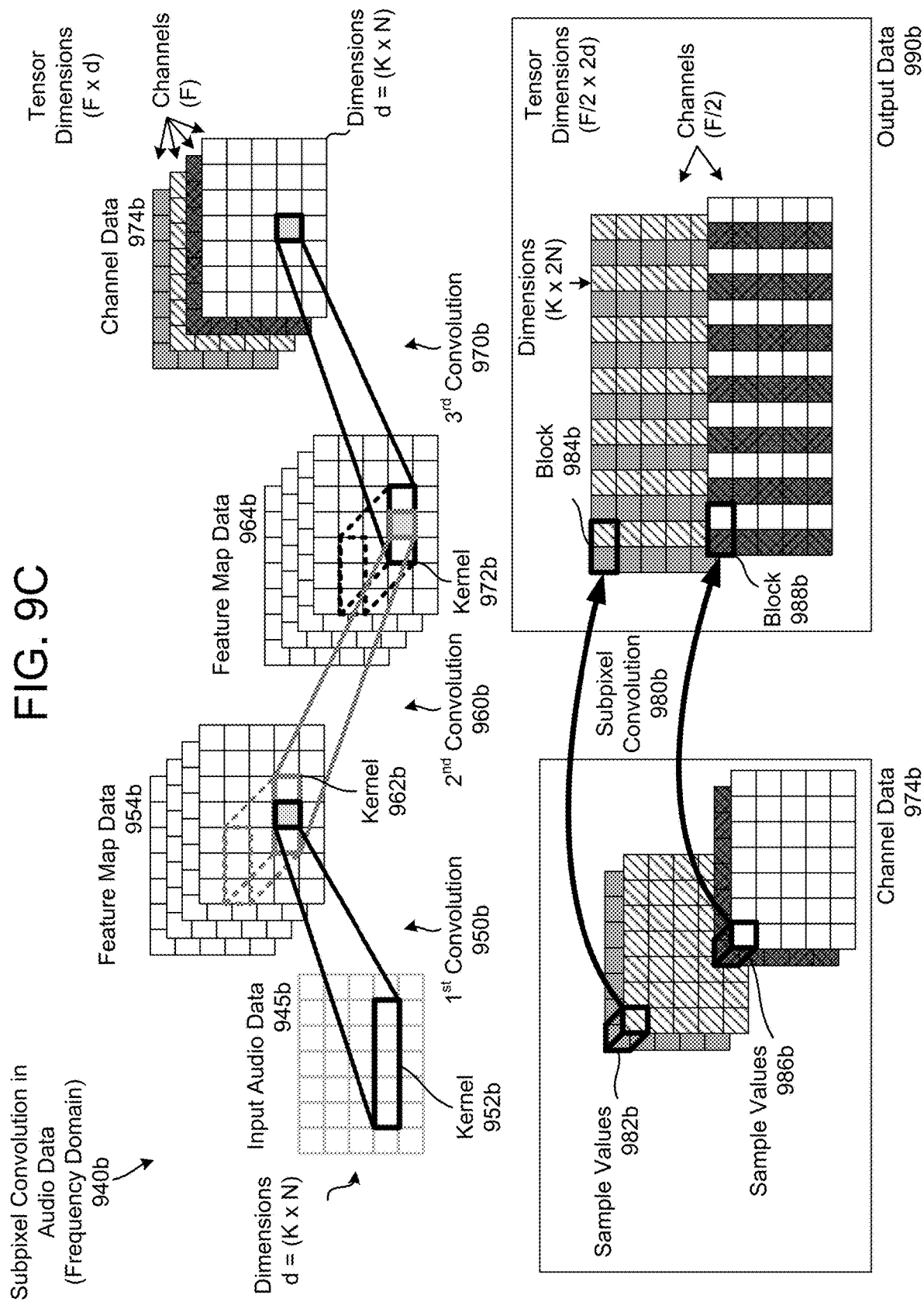

FIGS. 9A-9C illustrate examples of performing subpixel convolution using image data and audio data according to embodiments of the present disclosure. In conventional subpixel convolutional neural networks (CNNs), the subpixel convolution operation is performed on image data, as illustrated in FIG. 9A. For example, subpixel convolution in image data 900 corresponds to a process of shuffling pixels between multiple channels as part of upsampling. In the example illustrated in FIG. 9A, four channels may be combined to generate an output image with twice the horizontal pixels and twice the vertical pixels, although the disclosure is not limited thereto.

As illustrated in FIG. 9A, input image data 905 may have first image dimensions (e.g., $d=(N \times N)$). During a first convolution operation 910, a first kernel 912 (e.g., 5×5 kernel, although the disclosure is not limited thereto) may be applied to the input image data 905 to generate feature map data 914. The feature map data 914 may have the first image dimensions of the input image data 905 and may include multiple different feature maps (e.g., channels). During a second convolution operation 920, a second kernel 922 (e.g., 3×3 kernel, although the disclosure is not limited thereto) may be applied to the feature map data 914 to generate channel data 924. The channel data 924 may have channel dimensions equal to the first dimensions (e.g., $d=(N \times N)$), along with $r^2$ channels (e.g., $F=r^2$), resulting in tensor dimensions (e.g., $(F \times d)$ or $(r^2 \times (N \times N))$).

While FIG. 9A illustrates an example of performing two convolutional operations, the disclosure is not limited thereto and the channel data 924 may be generated using any number of convolutional operations without departing from the disclosure. For purposes of illustrating subpixel convolution, the key is that there are $r^2$ channels (e.g., four channels), which are illustrated in FIG. 9A using four different types of shading (e.g., crosshatch, diagonal shading, light gray shading, and white boxes).

The channel data 924 includes pixel values for a plurality of pixel locations. As there are four channels, the channel data 924 includes four separate pixel values for a single pixel location. As illustrated in FIG. 9A, four pixel values 932 correspond to a first pixel location located in a top left corner of the channel data 924, one pixel value for each of the four channels. During subpixel convolution 930, the pixel values 932 may be shuffled within a pixel block 934 corresponding to the first pixel location in output image data 936. For example, the output image data 936 may have second image dimensions (e.g., $d=(rN \times rN)$), where r is the upscale factor (e.g., 2). Thus, the four pixel values 932 that represent the first pixel location are used to represent the first pixel block 934 in the output image data 936.

While the concepts shown in FIG. 9A are illustrated with regard to image data, the same techniques may be applied to audio data to perform subpixel convolution using a series of audio samples. For example, in order to increase the time dimension during upsampling, one-dimensional (1D) version of the subpixel convolution can be performed on audio data.

FIG. 9B illustrates an example of performing subpixel convolution in audio data 940a in a time domain. In the example illustrated in FIG. 9B, the audio data is represented using a single dimension, such that the input audio data 945a comprises a string of audio samples over time. For example, subpixel convolution in audio data 940a corresponds to a process of shuffling audio samples between multiple channels as part of upsampling. In the example illustrated in FIG. 9B, four channels of audio data may be combined to generate two channels of output data with twice the number of audio samples, although the disclosure is not limited thereto.

As illustrated in FIG. 9B, input audio data 945a may have first dimensions (e.g., $d=(1 \times N)$). During a first convolution operation 950a, a first kernel 952a (e.g., 1×5 kernel, although the disclosure is not limited thereto) may be applied to the input audio data 945a to generate feature map data 954a. The feature map data 954a may have the same dimensions as the input audio data 945a and may include multiple different feature maps (e.g., channels). During a second convolution operation 960a, a second kernel 962a (e.g., 1×3 kernel, although the disclosure is not limited thereto) may be applied to the feature map data 954a to generate feature map data 964a. During a third convolution operation 970a, a third kernel 972a (e.g., 1×3 kernel, although the disclosure is not limited thereto) may be applied to the feature map data 964a to generate channel data 974a. The channel data 974a may have dimensions equal to the first dimensions (e.g., $d=(1 \times N)$), along with four channels (e.g., $F=4$), resulting in first tensor dimensions (e.g., $(F \times d)$ or $(F \times (1 \times N))$).

While FIG. 9B illustrates an example of performing three convolutional operations, the disclosure is not limited thereto and the channel data 974a may be generated using any number of convolutional operations without departing from the disclosure. For purposes of illustrating subpixel convolution, the key is that there are F channels (e.g., four channels), which are illustrated in FIG. 9B using four different types of shading (e.g., crosshatch, diagonal shading, light gray shading, and white boxes).

The channel data 974a includes sample values for a plurality of audio frames. As there are four channels, the channel data 974a includes four separate sample values for a single audio frame. As illustrated in FIG. 9B, a first audio frame may correspond to two sample values 982a in a first pair of channels and two sample values 986a in a second pair of channels. During subpixel convolution 980a, the two sample values 982a in the first pair of channels may be shuffled within a block 984a corresponding to the audio frame in a first channel of output data 990a, while the two sample values 986a in the second pair of channels may be shuffled within a block 988a corresponding to the audio frame in a second channel of the output data 990a. Thus, the four channels represented in the channel data 974a may be combined to generate two channels in the output data 990a that have twice the number of audio samples.

As illustrated in FIG. 9B, the two channels in the output data 990a may have second dimensions (e.g., 2d=(1×2N)). Thus, while the channel data 974a had first tensor dimensions (e.g., (F×d) or (F×(1×N)), the subpixel convolution 980a generated output data 990a having second tensor dimensions (e.g., (F/2×2d) or (F/2×(1×2N))).

FIG. 9C illustrates an example of performing subpixel convolution in audio data 940b in a frequency domain. In the example illustrated in FIG. 9C, the audio data is represented using two dimensions, with a first dimension corresponding to audio samples over time and a second dimension corresponding to frequency. However, despite being two dimensional, subpixel convolution in audio data 940b corresponds to a one dimensional process of shuffling audio samples between multiple channels as part of upsampling in time. In the example illustrated in FIG. 9C, four channels of audio data may be combined to generate two channels of output data with twice the number of audio samples, although the disclosure is not limited thereto.

As illustrated in FIG. 9C, input audio data 945b may have third dimensions (e.g., d=(K×N)), where K is the number of frequency bands and N is the total number of audio frames. During a first convolution operation 950b, a first kernel 952b (e.g., 1×5 kernel, although the disclosure is not limited thereto) may be applied to the input audio data 945b to generate feature map data 954b. While the input audio data 945b may extend in two dimensions, the first convolution operation 950b is one dimensional to avoid blurring different frequency bands. Thus, the feature map data 954b may have the same dimensions as the input audio data 945b and may include multiple different feature maps (e.g., channels).

During a second convolution operation 960b, a second kernel 962b (e.g., 1×3 kernel, although the disclosure is not limited thereto) may be applied to the feature map data 954b to generate feature map data 964b. During a third convolution operation 970b, a third kernel 972b (e.g., 1×3 kernel, although the disclosure is not limited thereto) may be applied to the feature map data 964b to generate channel data 974b. The channel data 974b may have dimensions equal to the third dimensions (e.g., d=(K×N)), along with four channels (e.g., F=4), resulting in first tensor dimensions (e.g., (F×d) or (F×(K×N))).

While FIG. 9C illustrates an example of performing three convolutional operations, the disclosure is not limited thereto and the channel data 974b may be generated using any number of convolutional operations without departing from the disclosure. For purposes of illustrating subpixel convolution, the key is that there are F channels (e.g., four channels), which are illustrated in FIG. 9C using four different types of shading (e.g., crosshatch, diagonal shading, light gray shading, and white boxes).

The channel data 974b includes sample values for a plurality of audio frames and a plurality of frequency bands. As there are four channels, the channel data 974b includes four separate sample values for a single audio frame and a single frequency band. As illustrated in FIG. 9C, a first frequency band associated with a first audio frame may correspond to two sample values 982b in a first pair of channels and two sample values 986b in a second pair of channels. During subpixel convolution 980b, the two sample values 982b in the first pair of channels may be shuffled within a block 984b corresponding to the audio frame in a first channel of output data 990b, while the two sample values 986b in the second pair of channels may be shuffled within a block 988b corresponding to the audio frame in a second channel of the output data 990b. Thus, the four channels represented in the channel data 974b may be combined to generate two channels in the output data 990b that have twice the number of audio samples.

As illustrated in FIG. 9C, the two channels in the output data 990b may have second dimensions (e.g., 2d=(K×2N)). Thus, while the channel data 974b had first tensor dimensions (e.g., (F×d) or (F×(K×N)), the subpixel convolution 980b generated output data 990b having second tensor dimensions (e.g., (F/2×2d) or (F/2×(K×2N))).

FIGS. 10A-10B illustrate example component diagrams for performing bandwidth extension optimization according to embodiments of the present disclosure. As described above, performing bandwidth extension corresponds to using cascaded subpixel CNNs to improve the quality of audio and extend the bandwidth of a narrowband input signal. Thus, the bandwidth extension component 122 may recreate high-quality audio data from low-quality, downsampled input audio data that includes only a small fraction of the original samples. For example, the bandwidth extension component 122 may use machine learning techniques, such as neural network-based techniques inspired by image super-resolution algorithms, to interpolate the low-resolution narrowband signal to a higher-resolution wideband signal (e.g., predict the missing samples of the narrowband signal). Conventional methods operate on a larger frame length and also need information from previous audio frames to train the DNN model. However, this results in latency and/or distortion and is not capable of real-time processing during a communication session (e.g., Voice over Internet Protocol (VoIP) communication session).

As illustrated in FIG. 10A, the system 100 may perform bandwidth extension optimization 1000 in the time domain in order to train and test the bandwidth extension component 122. For example, the system 100 may perform training 1002 to generate weights 1035 that may be used by the bandwidth extension component 122. After performing the training 1002, the system 100 may perform testing 1050 using the weights 1035 and further optimize the weights 1035 and/or the bandwidth extension component 122.

As illustrated in FIG. 10A, during training 1002 the system 100 needs both a narrowband signal and a wideband signal. Thus, the system 100 may receive a wideband signal 1005 and perform downsampling 1010 and then upsampling 1015 to the wideband signal 1005 to generate a narrowband signal. For example, the wideband signal may have a first bandwidth (e.g., 8 kHz speech bandwidth) and a first sampling rate (e.g., 16 kHz sampling rate) and the system 100 may downsample the wideband signal to generate a first narrowband signal having a second bandwidth (e.g., 4 kHz speech bandwidth) and a second sampling rate (e.g., 8 kHz sampling rate). To simplify processing, the system 100 may upsample the first narrowband signal to generate a second narrowband signal having the first sampling rate (e.g., 16 kHz, which is the same as the wideband signal). While the second narrowband signal has the same sampling rate as the wideband signal, the second narrowband signal only includes low frequency components within the second bandwidth.

The system 100 may perform first feature extraction 1020 using the second narrowband signal to generate first features X associated with the second narrowband signal and may perform second feature extraction (labels) 1025 using the wideband signal 1005 to generate second features Y associated with the wideband signal 1005. The system 100 may process the first features X and the second features Y using a deep neural network (DNN) model 1030 to generate the weights 1035.

As FIG. 10A illustrates performing training 1002 on a time-domain signal, the feature extraction 1020/1025 may perform windowing on the time-domain audio data using a hamming window along with a 50% overlap between frames, although the disclosure is not limited thereto. For example, the system 100 may split the audio signal into audio frames (e.g., 8 ms audio frames with 50% overlap). As the sampling rate is equal to 16 kHz, the system 100 may generate 128 audio samples per audio frame, although the disclosure is not limited thereto.

During testing 1050, the system 100 may use testing data to further optimize the bandwidth extension component 122. For example, the testing data may include a narrowband signal 1055 and a first wideband signal (not illustrated) used as a frame of reference for the bandwidth extension component 122. Thus, the system 100 may receive the narrowband signal 1055 and may perform upsampling 1060, feature extraction 1065, and bandwidth extension (e.g., using bandwidth extension component 122) to generate a second wideband signal 1070. By comparing the second wideband signal 1070 generated by the bandwidth extension component 122 to the first wideband signal associated with the testing data, the system 100 may determine an accuracy and/or audio quality associated with the bandwidth extension and further optimize the weights 1035.

While FIG. 10A illustrates an example of training and testing the bandwidth extension component 122 to process a narrowband audio signal in a time domain, the disclosure is not limited thereto and the system 100 may configure the bandwidth extension component 1222 to process a narrowband audio signal in a frequency domain without departing from the disclosure. For example, FIG. 10B illustrates performing bandwidth extension optimization 1075 in the frequency domain. As many of the components illustrated in FIG. 10B are described above with regard to FIG. 10A, a redundant description is omitted.

As illustrated in FIG. 10B, during training 1002 the system 100 may receive the wideband signal 1005 in the time domain and may convert the wideband signal 1005 to the frequency domain. For example, the system 100 may perform Fast Fourier Transform (FFT) and windowing 1080 to convert the wideband signal 1005 from the time domain to the frequency domain. In some examples, the system 100 may represent the wideband signal 1005 using 128 different frequency bins (e.g., subbands), although the disclosure is not limited thereto. The system 100 may perform training 1002 as described above with regard to FIG. 10A, except that the system 100 processes the wideband signal 1005 and the narrowband signal separately for each of the frequency bins.

Similarly, during testing 1050 the system 100 may receive the narrowband signal 1055 in the time domain and may convert the narrowband signal 1055 to the frequency domain. For example, the system 100 may perform FFT and windowing 1085 to convert the narrowband signal 1055 from the time domain to the frequency domain. In some examples, the system 100 may represent the narrowband signal 1055 using 128 different frequency bins (e.g., subbands), although the disclosure is not limited thereto. The system 100 may perform testing 1050 as described above with regard to FIG. 10A, except that the system 100 processes the narrowband signal 1055 separately for each of the frequency bins.

In addition, the bandwidth extension component 122 may generate a wideband signal 1095 in the frequency domain. Thus, the system 100 may perform Inverse Fast Fourier Transform (IFFT) and synthesis 1090 to convert the wideband signal 1095 in the frequency domain to the wideband signal 1079 in the time domain.

FIG. 11 is a block diagram conceptually illustrating a device 110 that may be used with the remote system 120. FIG. 12 is a block diagram conceptually illustrating example components of a remote device, such as the media transport system 120. In operation, the system 100 may include computer-readable and computer-executable instructions that reside on the device 110 and/or the media transport system 120, as will be discussed further below. In addition, multiple devices 110 and/or multiple media transport systems 120 may be included in the system 100 of the present disclosure without departing from the disclosure.

The media transport system 120 may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The media transport system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Each of these devices (110/120) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (110/120) may also include a data storage component (1108/1208) for storing data and controller/processor-executable instructions. Each data storage component (1108/1208) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1102/1202).

Each device (110/120) may include components that may comprise processor-executable instructions stored in storage (1108/1208) to be executed by controller(s)/processor(s) (1104/1204) (e.g., software, firmware, hardware, or some combination thereof). For example, components of the device (110/120) may be part of a software application running in the foreground and/or background on the device (110/120). Some or all of the controllers/components of the device (110/120) may be executable instructions that may be embedded in hardware or firmware in addition to, or instead of, software. In one embodiment, the device (110/120) may operate using an Android operating system (such as Android 4.3 Jelly Bean, Android 4.4 KitKat or the like), an Amazon operating system (such as FireOS or the like), or any other suitable operating system.

Computer instructions for operating each device (110/120) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/120) includes input/output device interfaces (1102/1202). A variety of components may be connected through the input/output device interfaces (1102/1202), as will be discussed further below. Additionally, each device (110/120) may include an address/data bus (1124/1224) for conveying data among components of the respective device. Each component within a device (110/120) may also be directly connected to other components in addition to (or instead of) being connected to other components across the bus (1124/1224).

Referring to FIG. 11, the device 110 may include input/output device interfaces 1102 that connect to a variety of components such as an audio output component such as a speaker 1112, a wired headset or a wireless headset (not illustrated), or other component capable of outputting audio (e.g., producing sound). The audio output component may be integrated into a single device or may be separate. The device 110 may also include one or more audio capture component(s). For example, the device 110 may include one or more microphone(s) 112 (e.g., a plurality of microphone(s) 112 in a microphone array), a wired headset or a wireless headset (not illustrated), and/or the like. The audio capture component(s) may be integrated into a single device or may be separate. If an array of microphones is included, approximate distance to a sound's point of origin may be determined by acoustic localization based on time and amplitude differences between sounds captured by different microphones of the array. The device 110 may additionally include a display (not illustrated) for displaying content and/or may further include a camera (not illustrated), although the disclosure is not limited thereto. In some examples, the microphone(s) 1120 and/or loudspeaker(s) 1112 may be external to the device 110, although the disclosure is not limited thereto. The input/output interfaces 1102 may include A/D converters (not illustrated) and/or D/A converters (not illustrated) without departing from the disclosure.

The input/output device interfaces 1102 may also include an interface for an external peripheral device connection such as universal serial bus (USB), FireWire, Thunderbolt, Ethernet port or other connection protocol that may connect to network(s) 199.

The input/output device interfaces 1102/1202 may be configured to operate with network(s) 199. For example, via antenna(s) 1114, the input/output device interfaces 1102 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Thus, the devices (110/120) may be connected to the network(s) 199 through either wired or wireless connections.

The network(s) 199 may include a local or private network or may include a wide network (e.g., wide area network (WAN)), such as the internet. Through the network(s) 199, the system may be distributed across a networked environment. The I/O device interface (1102/1202) may also include communication components that allow data to be exchanged between devices such as different physical servers in a collection of servers or other components.

The components of the device 110 and/or the media transport system 120 may include their own dedicated processors, memory, and/or storage. Alternatively, one or more of the components of the device 110 and/or the media transport system 120 may utilize the I/O interfaces (1102/1202), processor(s) (1104/1204), memory (1106/1206), and/or storage (1108/1208) of the device(s) 110 and/or the media transport system 120.

As noted above, multiple devices may be employed in a single system. In such a multi-device system, each of the devices may include different components for performing different aspects of the system's processing. The multiple devices may include overlapping components. The components of the device 110, the remote system 120, and a skill component 125, as described herein, are illustrative, and may be located as a stand-alone device or may be included, in whole or in part, as a component of a larger device or system.

Figure 13:
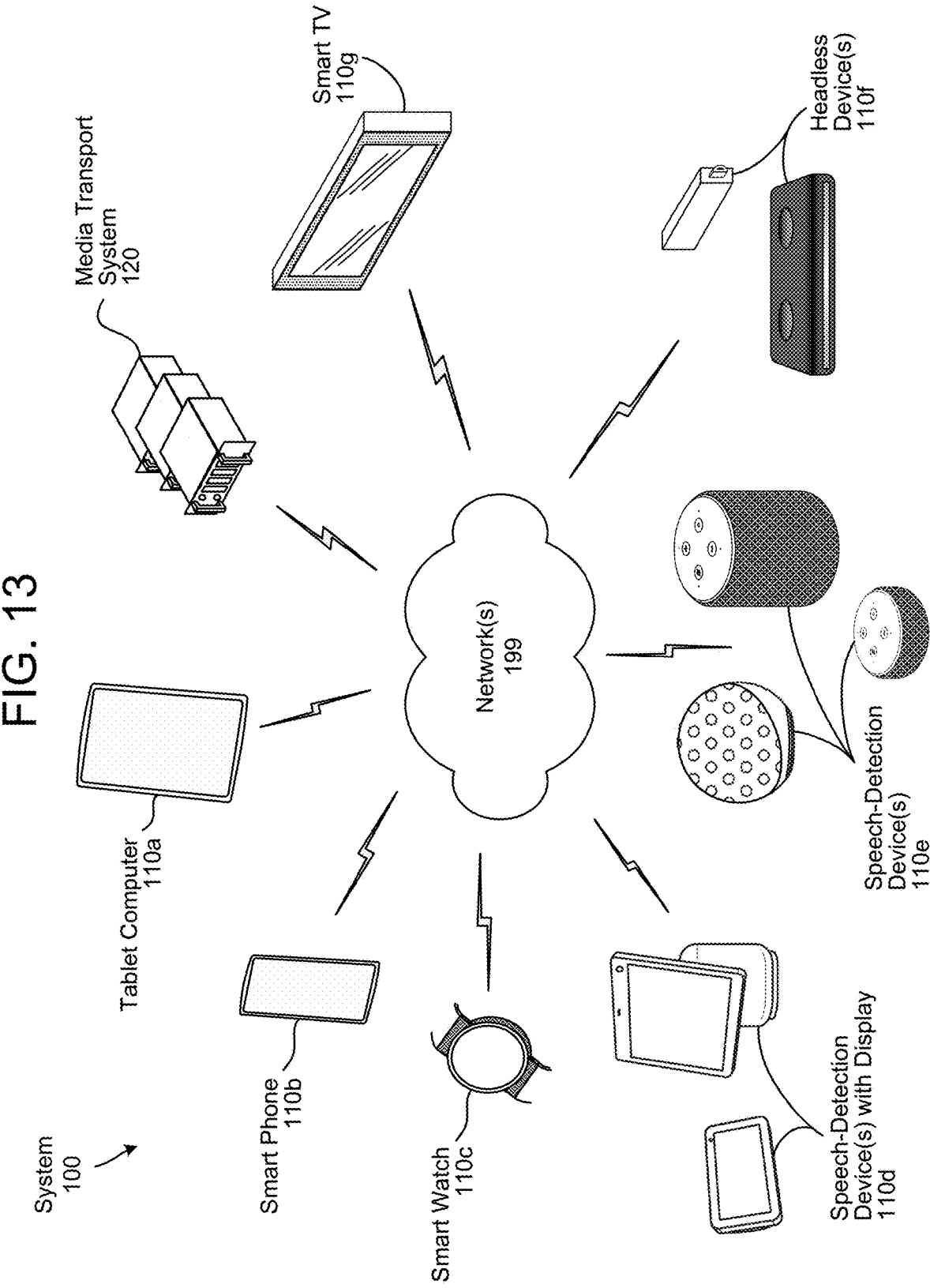
FIG. 13 illustrates an example of a computer network for use with the overall system, according to embodiments of the present disclosure.

The bandwidth extension component 122 may be included in one or more devices without departing from the disclosure. For example, the bandwidth extension component 122 may be included in the media transport system 120, as illustrated in FIG. 1. Additionally or alternatively, the bandwidth extension component 122 may be included in the device 110 without departing from the disclosure. As illustrated in FIG. 13, the device 110 may correspond to multiple different designs without departing from the disclosure.

As illustrated in FIG. 13, multiple devices (110a-110g and 120) may contain components of the system and the devices may be connected over a network(s) 199. The network(s) 199 may include a local or private network or may include a wide network such as the Internet (e.g., Wide Area Network (WAN)). Devices may be connected to the network(s) 199 through either wired or wireless connections. For example, a tablet computer 110a, a smart phone 110b, a smart watch 110c, speech-detection device(s) with a display 110d, speech-detection device(s) 110e, headless device(s) 110h, and/or a smart television 110g may be connected to the network(s) 199 through a wired and/or wireless connection, such as an Ethernet port, a wireless service provider, over a Wi-Fi or cellular network connection, and/or the like. Other devices are included as network-connected support devices, such as the media transport system 120, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device and/or another device connected via the network(s) 199 without departing from the disclosure.

The concepts disclosed herein may be applied within a number of different devices and computer systems, including, for example, general-purpose computing systems, speech processing systems, server-client computing systems, mainframe computing systems, telephone computing systems, laptop computers, cellular phones, personal digital assistants (PDAs), tablet computers, video capturing devices, wearable computing devices (watches, glasses, etc.), other mobile devices, video game consoles, speech processing systems, distributed computing environments, etc. Thus the components, components and/or processes described above may be combined or rearranged without departing from the present disclosure. The functionality of any component described above may be allocated among multiple components, or combined with a different component. As discussed above, any or all of the components may be embodied in one or more general-purpose microprocessors, or in one or more special-purpose digital signal processors or other dedicated microprocessing hardware. One or more components may also be embodied in software implemented by a processing unit. Further, one or more of the components may be omitted from the processes entirely.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media.

Embodiments of the present disclosure may be performed in different forms of software, firmware, and/or hardware. For example, an acoustic front end (AFE), may comprise, among other things, analog and/or digital filters (e.g., filters configured as firmware to a digital signal processor (DSP)). Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
   receiving first audio data representing first audio in a first frequency range;
   generating, using the first audio data and a first model, second audio data, wherein the first model includes a first plurality of convolutional layers associated with first parameter values;
   generating, using the first audio data and the second audio data, third audio data representing second audio in a second frequency range that is larger than the first frequency range and includes the first frequency range;
   generating, using the third audio data and a second model, fourth audio data, wherein the second model includes a second plurality of convolutional layers associated with second parameter values that are different than the first parameter values, the first plurality of convolutional layers and the second plurality of convolutional layers having an equal number of layers; and
   generating, using the third audio data and the fourth audio data, fifth audio data representing third audio in a third frequency range that is larger than the second frequency range and includes the second frequency range.

2. The computer-implemented method of claim 1, wherein the first model corresponds to a first subpixel convolutional neural network and the second model corresponds to a second subpixel convolutional neural network.

3. The computer-implemented method of claim 1, wherein the first audio data is received from a first device, the method further comprising:
   sending the fifth audio data to a second device;
   receiving sixth audio data from the second device; and
   sending the sixth audio data to the first device.

4. The computer-implemented method of claim 1, wherein generating the second audio data further comprises:
   generating, using the first audio data and at least one downsampling layer of the first model, first data;
   generating, using the first data and a convolutional layer of the first model, second data;
   generating, using the second data and a subpixel convolutional layer of the first model, third data; and
   generating, using the third data and at least one upsampling layer of the first model, the second audio data.

5. The computer-implemented method of claim 1, wherein generating the second audio data further comprises:
   generating, using the first audio data and a plurality of layers of the first model, first data including at least a first channel and a second channel, the first channel including a first number of samples and the second channel including a second number of samples;
   generating, using the first data and a subpixel convolutional layer of the first model, second data including at least a third channel comprised of the first channel and the second channel, the third channel including the first number of samples and the second number of samples; and generating, using the second data and at least an upsampling layer of the first model, the second audio data.

6. The computer-implemented method of claim 1, wherein generating the second audio data further comprises:
generating, using the first audio data and at least a downsampling layer of the first model, first data having first dimensions and a first number of channels; and
generating, using the first data and a first layer of the first model, second data having second dimensions and a second number of channels, the second dimensions smaller than the first dimensions.

7. The computer-implemented method of claim 6, wherein generating the second audio data further comprises:
generating, using the second data and at least a convolutional layer of the first model, third data having the second dimensions and a third number of channels smaller than the second number of channels;
generating, using the third data and a subpixel convolutional layer of the first model, fourth data having third dimensions larger than the second dimensions;
generating fifth data by concatenating the fourth data and the first data; and
generating, using the fifth data and at least an upsampling layer of the first model, the second audio data.

8. The computer-implemented method of claim 1, wherein generating the second audio data further comprises:
generating, using the first audio data and a first convolutional layer of the first model, first data including a first value that is positive and a second value that is negative;
generating, using the first data and a first activation function, second data including the first value and a third value equal to the second value multiplied by a coefficient value; and
generating, using the second data and the first model, the second audio data.

9. The computer-implemented method of claim 8, wherein generating the fourth audio data further comprises:
generating, using the third audio data and a second convolutional layer of the second model, third data including a fourth value that is positive and a fifth value that is negative;
generating, using the third data and a second activation function, fourth data, the fourth data including the fourth value and a sixth value equal to zero; and
generating, using the fourth data and the second model, the fourth audio data.

10. The computer-implemented method of claim 1, wherein:
the second audio data represents fourth audio in a fourth frequency range, the fourth frequency range having a first bandwidth,
the second frequency range includes the first frequency range and the fourth frequency range,
the fourth audio data represents fifth audio in a fifth frequency range, the fifth frequency range having the first bandwidth, and
the third frequency range includes the second frequency range and the fifth frequency range.

11. The computer-implemented method of claim 1, wherein generating the second audio data further comprises:
generating, using one of the first plurality of convolutional layers and first data having first dimensions and a first number of channels, second data having the first dimensions and a second number of channels smaller than the first number of channels; and
generating, using the second data and a subpixel convolutional layer of the first model, third data having second dimensions larger than the first dimensions and a third number of channels smaller than the second number of channels, wherein the second audio data is generated using the third data.

12. A system comprising:
at least one processor; and
memory including instructions operable to be executed by the at least one processor to cause the system to:
receive first audio data representing first audio in a first frequency range;
generate, using the first audio data and a first model, second audio data, wherein a first input and a first output of the first model have a first number of channels and first dimensions;
generate, using the first audio data and the second audio data, third audio data representing second audio in a second frequency range that is larger than the first frequency range and includes the first frequency range;
generate, using the third audio data and a second model, fourth audio data, wherein a second input and a second output of the second model have the first number of channels and the first dimensions; and
generate, using the third audio data and the fourth audio data, fifth audio data representing third audio in a third frequency range that is larger than the second frequency range and includes the second frequency range.

13. The system of claim 12, wherein the memory further comprises instructions that, when executed by the at least one processor, further cause the system to:
generate, using the first audio data and at least one downsampling layer of the first model, first data;
generate, using the first data and a convolutional layer of the first model, second data;
generate, using the second data and a subpixel convolutional layer of the first model, third data; and
generate, using the third data and at least one upsampling layer of the first model, the second audio data.

14. The system of claim 12, wherein the memory further comprises instructions that, when executed by the at least one processor, further cause the system to:
generate, using the first audio data and a plurality of layers of the first model, first data including at least a first channel and a second channel, the first channel including a first number of samples and the second channel including a second number of samples;
generate, using the first data and a subpixel convolutional layer of the first model, second data including at least a third channel comprised of the first channel and the second channel, the third channel including the first number of samples and the second number of samples; and
generate, using the second data and at least an upsampling layer of the first model, the second audio data.

15. The system of claim 12, wherein the memory further comprises instructions that, when executed by the at least one processor, further cause the system to:
generate, using the first audio data and at least a downsampling layer of the first model, first data having second dimensions and a second number of channels; and generate, using the first data and a first layer of the first model, second data having third dimensions and a third number of channels, the third dimensions smaller than the second dimensions.

16. The system of claim 15, wherein the memory further comprises instructions that, when executed by the at least one processor, further cause the system to:
generate, using the second data and at least a convolutional layer of the first model, third data having the third dimensions and a fourth number of channels smaller than the third number of channels;
generate, using the third data and a subpixel convolutional layer of the first model, fourth data having the second dimensions, wherein the second dimensions are larger than the third dimensions;
generate fifth data by concatenating the fourth data and the first data; and
generate, using the fifth data and at least an upsampling layer of the first model, the second audio data.

17. The system of claim 12, wherein the memory further comprises instructions that, when executed by the at least one processor, further cause the system to:
generate, using the first audio data and a first convolutional layer of the first model, first data including a first value that is positive and a second value that is negative;
generate, using the first data and a first activation function, second data including the first value and a third value equal to the second value multiplied by a coefficient value; and
generate, using the second data and the first model, the second audio data.

18. The system of claim 17, wherein the memory further comprises instructions that, when executed by the at least one processor, further cause the system to:
generate, using the third audio data and a second convolutional layer of the second model, third data including a fourth value that is positive and a fifth value that is negative;
generate, using the third data and a second activation function, fourth data, the fourth data including the fourth value and a sixth value equal to zero; and
generate, using the fourth data and the second model, the fourth audio data.

19. The system of claim 12, wherein:
the second audio data represents fourth audio in a fourth frequency range, the fourth frequency range having a first bandwidth,
the second frequency range includes the first frequency range and the fourth frequency range,
the fourth audio data represents fifth audio in a fifth frequency range, the fifth frequency range having the first bandwidth, and
the third frequency range includes the second frequency range and the fifth frequency range.

20. A computer-implemented method, the method comprising:
receiving first audio data representing first audio in a first frequency range;
generating, using the first audio data and a first model, second audio data representing second audio in a second frequency range that is larger than the first frequency range and includes the first frequency range, wherein generating the second audio data further comprises:
generating, using the first audio data and a first plurality of convolutional layers of the first model, first feature data representing first amplitude values, and
generating, by the first model using the first audio data and the first feature data, the second audio data; and
generating, using the second audio data and a second model, third audio data representing third audio in a third frequency range that is larger than the second frequency range and includes the second frequency range, wherein generating the third audio data further comprises:
generating, using the second audio data and a second plurality of convolutional layers of the second model, second feature data representing second amplitude values, and
generating, by the second model using the second audio data and the second feature data, the third audio data.

* * * * *